(12) United States Patent
Cioffi et al.

(10) Patent No.: US 11,696,155 B2
(45) Date of Patent: Jul. 4, 2023

(54) ERGODIC SPECTRUM MANAGEMENT SYSTEMS AND METHODS

(71) Applicant: ASSIA SPE, LLC, Wilmington, DE (US)

(72) Inventors: John M. Cioffi, Atherton, CA (US); Chan-Soo Hwang, Sunnyvale, CA (US); Kenneth J. Kerpez, Long Valley, NJ (US); Jisung Oh, Palo Alto, CA (US); Ioannis Kanellakopoulos, Redwood City, CA (US); Peter Chow, Los Altos, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 77 days.

(21) Appl. No.: 16/804,000

(22) Filed: Feb. 27, 2020

(65) Prior Publication Data
US 2020/0280863 A1  Sep. 3, 2020

Related U.S. Application Data

(60) Provisional application No. 62/861,979, filed on Jun. 14, 2019, provisional application No. 62/861,993, (Continued)

(51) Int. Cl.
*H04W 24/02* (2009.01)
*H04W 28/16* (2009.01)
*H04W 24/10* (2009.01)

(52) U.S. Cl.
CPC ........... *H04W 24/02* (2013.01); *H04W 24/10* (2013.01); *H04W 28/16* (2013.01)

(58) Field of Classification Search
CPC ........... A61K 38/57; A61K 45/06; A61P 1/16; C07K 14/8121; H04W 16/10; H04W 24/02; H04W 24/10; H04W 28/16
(Continued)

(56) References Cited

U.S. PATENT DOCUMENTS 5,970,064 A  10/1999  Clark et al.
8,249,520 B2  8/2012  Chuang et al.
(Continued)

FOREIGN PATENT DOCUMENTS

WO  2014052271 A1  3/2014
WO  2016123497 A  8/2016
(Continued)

OTHER PUBLICATIONS

John M. Cioffi, Diginal Data Transmission, Nov. 2018, The Gaussian Vector Broadcast Channel, Chapter 14 available from the Internet <URL https://web.archive.org/web/201701231846> (46 pgs).
(Continued)

*Primary Examiner* — Margaret G Mastrodonato
*Assistant Examiner* — Nicole M Louis-Fils
(74) *Attorney, Agent, or Firm* — North Weber & Baugh LLP; Michael North

(57) ABSTRACT

Presented are Ergodic Spectrum Management (ESM) systems and methods that take advantage of the presence of statistical consistencies ("ergodicity") and correlations, such as a wireless network's average dimensional consistencies of probability distributions (in time, space, and frequency) of channel gains, to adaptively learn qualitative and quantitative network/user behavior; estimate or predict network performance; and guide locally implemented radio resource management (RRM) decisions of wireless multi-user transmissions in a manner such as to reduce interference and improve latency; connection stability; efficiency; and overall wireless performance. ESM also enhances end-users' Quality of Experience (QoE) by allowing movement across bands and regions as users/devices roam. A remote-cloud-based resource management implementation of ESM's Learn-ed Resource Managers (LRMs) removes the need for heavy edge-computing close to radio cells.

20 Claims, 16 Drawing Sheets

Related U.S. Application Data filed on Jun. 14, 2019, provisional application No. 62/812,149, filed on Feb. 28, 2019, provisional application No. 62/812,086, filed on Feb. 28, 2019.

(58) Field of Classification Search
USPC .......................................................... 455/446
See application file for complete search history.

(56) References Cited

U.S. PATENT DOCUMENTS

| | | | |
|---|---|---|---|
| 9,313,752 | B2 | 4/2016 | Czaja et al. |
| 2003/0198200 | A1 | 10/2003 | Diener et al. |
| 2005/0190868 | A1 | 9/2005 | Khandekar et al. |
| 2006/0187885 | A1 | 8/2006 | Roy et al. |
| 2008/0075007 | A1* | 3/2008 | Mehta .................. H04W 40/22 370/254 |
| 2009/0147697 | A1 | 6/2009 | Malik et al. |
| 2009/0175191 | A1 | 7/2009 | Lin et al. |
| 2009/0020773 | A1 | 8/2009 | Stamoulis et al. |
| 2011/0002371 | A1 | 1/2011 | Forenza et al. |
| 2012/0009890 | A1 | 1/2012 | Curcio et al. |
| 2013/0072213 | A1* | 3/2013 | Agrawal ........... H04W 72/1231 455/452.2 |
| 2014/0098705 | A1 | 4/2014 | Chow et al. |
| 2014/0200038 | A1 | 7/2014 | Rao et al. |
| 2014/0258505 | A1 | 9/2014 | Liao et al. |
| 2014/0269269 | A1* | 9/2014 | Kowali ................ H04W 24/04 370/229 |
| 2014/0269300 | A1* | 9/2014 | Bennis ................. H04W 28/08 370/235 |
| 2014/0280679 | A1* | 9/2014 | Dey ....................... H04L 65/80 709/213 |
| 2014/0099967 | A1 | 10/2014 | Egner et al. |
| 2015/0172216 | A1 | 6/2015 | Bellizia et al. |
| 2015/0326455 | A1 | 11/2015 | Hui et al. |
| 2016/0242194 | A1* | 8/2016 | Mitola .................. H04L 5/0037 |
| 2018/0242191 | A1* | 8/2018 | Lundqvist ............. H04W 40/12 |
| 2019/0364457 | A1* | 11/2019 | Szilagyi .............. H04L 41/5025 |

FOREIGN PATENT DOCUMENTS

| | | |
|---|---|---|
| WO | 2016123497 A1 | 8/2016 |
| WO | 2018068857 A1 | 4/2018 |

OTHER PUBLICATIONS

Yu et al. "Iterative Water-filling for Gaussian Vector Multiple Access Channels", IEEE Transactions on Information Theory • Jan. 2004. (17 pgs).

Cendrillon et al., "Optimal Multiuser Spectrum Balancing for Digital Subscriber Lines", IEEE Transactions on Communications. May 2006. (13 pgs).

Aldababasa et al., "A Tutorial on Nonorthogonal Multiple Access for 5G and Beyond", Wireless Communications and Mobile Computing, vol. 2018, Article ID 9713450. (25 pgs).

Refik Caglar Kizilirmak, Non-Orthogonal Multiple Access (NOMA) for 5G Networks, <URL:http://dx.doi.org/10.5772/66048>. (16 pgs).

Chen et al. "Scalable and Flexible Massive Mimo Precoding for 5G H-CRAN", Architecture for Next Generation Wireless Networks: Scalability, Flexibilty, and Interoperability, (7 pgs).

Ginis et al. "Dynamic Digital Communication System Control", U.S. Pat. No. 9,843,348. Dec. 12, 2017. (28 pgs).

International Search Report and Written Opinion of the International Searching Authority, dated May 11, 2020 in the PCT Application No. PCT/US2020/020242, (9 pgs).

Cioffi et al., "Ergodic Spectrum Management", IEEE Transactions, vol. 68, No. 3, pp. 1794-1821, Mar. 2020 (31 pgs).

Calabrese et al., "Learning Radio Resource Management in RANs: Framework, Opportunities and Challenges" Huawei Technologies Sweden AB, Wireless Network Algorithms Lab, Kista, Sweden University of Southampton, School of ECS, Wireless. May 20, 2018. <URL:http://arXiv:1611.10253v3cs.NI>. (8 pgs).

Olwal et al., "A Survery of Resource Management Toward 5G Radio Access Networks", IEEE Communications Surveys & Tutorials, vol. 18, No. 3 Third Quater 2016 (31 pgs).

Iwakuni et al., "Null-Space Expansion for Multiuser Massive MIMO Inter-User Interference Suppression in Time Varying Channels" IEICE Trans. Commun., vol. E100-B, No. May 5, 2017, (9 pgs).

Md. Shipon Ali, "An Overview on Interference Management in 3GPP LTE-Advanced Heterogeneous Networks", International Journal of Future Generation Communication and Networking vol. 8, No. 1 (2015), pp. 55-68. <URL:http://dx.doi.org/10.14257/ijfgcn.2015.8.1.07>. (15 pgs).

John M. Cioffi, Digital Data Transmission, Nov. 2018, Signal Processing and Detection, Chapter 1 available from the Internet <URL:https://web.archive.org/web/201701231846> (110 pgs).

John M. Cioffi, Digital Data Transmission, Nov. 2018, Multi-Channel Modulation, Chapter 4 available from the Internet <URL: https://web.archive.org/web/201701231846> (134 pgs).

John M. Cioffi, Digital Data Transmission, Nov. 2018, Generalized Decision Feedback Equalizaiton, Chapter 5 available from the Internet <URL:https://web.archive.org/web/201701231846> (128 pgs).

John M. Cioffi, Diginal Data Transmission, Nov. 2018, Multi-User Fundamentals, Chapter 12 available from the Internet <URL https://web.archive.org/web/201701231846> (61 pgs).

John M. Cioffi, Diginal Data Transmission, Nov. 2018, The Gaussian Vector Multiple Access Channel, Chapter 13 available from the Internet <URL https://web.archive.org/web/201701231846> (53 pgs).

Advisory Action dated Nov. 29, 2021 in related U.S. Appl. No. 17/102,099, (5 pgs).

Advisory Action Response dated Dec. 16, 2021 in related U.S. Appl. No. 17/102,099, (9 pgs).

Final Office Action dated Oct. 15, 2021 in related U.S. Appl. No. 17/102,099, (26 pgs).

Final Office Action Response dated Nov. 9, 2021 in related U.S. Appl. No. 17/102,099, (9 pgs).

"LAN Segmentation", available from the Internet, <http://netcert.tripod.com/ccna/internetworking/lanseg.html>, (2 pgs).

Notice of Allowance dated May 16, 2022 in related Canadian patent application No. 2,855,461, (1 pg).

Examination Report No. 1 dated Jun. 9, 2022 in related Australian patent application No. 2020229857, (3 pgs).

Office action dated Sep. 16, 2022 in related Indian patent application No. 202117038738, (6 pgs).

Response to office action dated Oct. 6, 2022 in related Indian patent application No. 202117038738, (3 pgs).

Non-Final office action dated Sep. 29, 2022 in related U.S. Appl. No. 17/102,099, (29 pgs).

Office action dated Oct. 3, 2022 in related Canadian patent application No. 3,129,522, (4 pgs).

Office action dated Oct. 7, 2022 in related European patent application No. 20762897.5, (11 pgs).

Yaohua et al., "Application of Machine Learning in Wireless Networks: Key Techniques and Open Issues", arXiv:1809.08707v2 [cs.NI] Mar. 1, 2019, available from the Internet, <URL:https://arxiv.org/pdf/1809.08707.pdf>, (34 pgs).

Response to Indian office action dated Nov. 15, 2022 in related Indian patent application No. 202117038738, (3 pgs).

Response to Canadian office action dated Feb. 3, 2023 in related Canadian patent application No. 3,129,522, (15 pgs).

Final office action dated Jan. 13, 2023 in related U.S. Appl. No. 17/102,099, (23 pgs).

Advisory Action dated Mar. 22, 2023 in related U.S. Appl. No. 17/102,099, (8 pgs).

Notice of Allowance dated May 2, 2023 in related U.S. Appl. No. 17/102,099, (8 pgs).

\* cited by examiner

ERGODIC SPECTRUM MANAGEMENT SYSTEMS AND METHODS

CROSS-REFERENCE TO RELATED APPLICATIONS

This patent application is related to and claims priority benefit under 35 USC § 119(e) to the following commonly-owned U.S. provisional patent applications: U.S. Pat. App. Ser. No. 62/861,993, filed on Jun. 14, 2019, entitled "Ergodic Spectrum Management Systems and Methods," and listing John M. Cioffi, Chan-Soo Hwang, and Kenneth Kerpez as inventors; commonly-owned U.S. Pat. App. Ser. No. 62/812,086, filed on Feb. 28, 2019, entitled "Systems and Methods for Ergodic Spectrum Management," and listing John M. Cioffi, Chan-Soo Hwang, Jisung Oh, Ioannis Kanellakopoulos, Peter Chow, and Kenneth Kerpez as inventors; commonly-owned U.S. Pat. App. Ser. No. 62/812,149, filed on Feb. 28, 2019, entitled "Ergodic Spectrum Management (ESM)," and listing John M. Cioffi, as inventor; and U.S. Pat. App. Ser. No. 62/861,979, filed on Jun. 14, 2019, entitled "Ergodic Spectrum Management Systems and Methods," and listing John M. Cioffi, Chan-Soo Hwang, and Kenneth Kerpez as inventors. Each reference mentioned in this patent document is herein incorporated by reference in its entirety.

BACKGROUND

The present disclosure relates generally to resource management in communication systems. More particularly, the present disclosure relates to resource management in communication systems that utilize stochastic optimization systems and methods such as Ergodic Spectrum Management (ESM).

As bandwidths widen in modern communication systems, radio resource management (RRM) has increasingly exploited the appearance of a slower relative time variation (to the wider bandwidth) in instance-dependent designs for licensed and unlicensed (e.g., Wi-Fi) spectra. Wireless RRM then increasingly approximates dynamic spectrum management's (DSM's) slow-time-variation methods used in wireline copper networks, where the instantaneous channel in both wireless' RRM and wireline's DSM is presumed tracked/learned accurately. Some DSM methods are predecessors of what wireless systems expand upon and are called "Non-Orthogonal Multiple Access" or NOMA. Traditional RRM depends on low-latency resource assignment, causing computational capability to be placed closer to the radio cells, often known as "edge computing," or "fog computing." This traditional RRM presumes a nearly instantaneous knowledge of all channels, noises, and interference levels to which the edge computing must quickly respond.

Accordingly, it would be desirable to reduce the need for computation for RRM at the edge by moving computations to the cloud and improve upon existing radio resource management, particularly advancing unlicensed spectrum-use efficiency to levels at or exceeding those associated with licensed spectra.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF EMBODIMENTS

Figure 1:
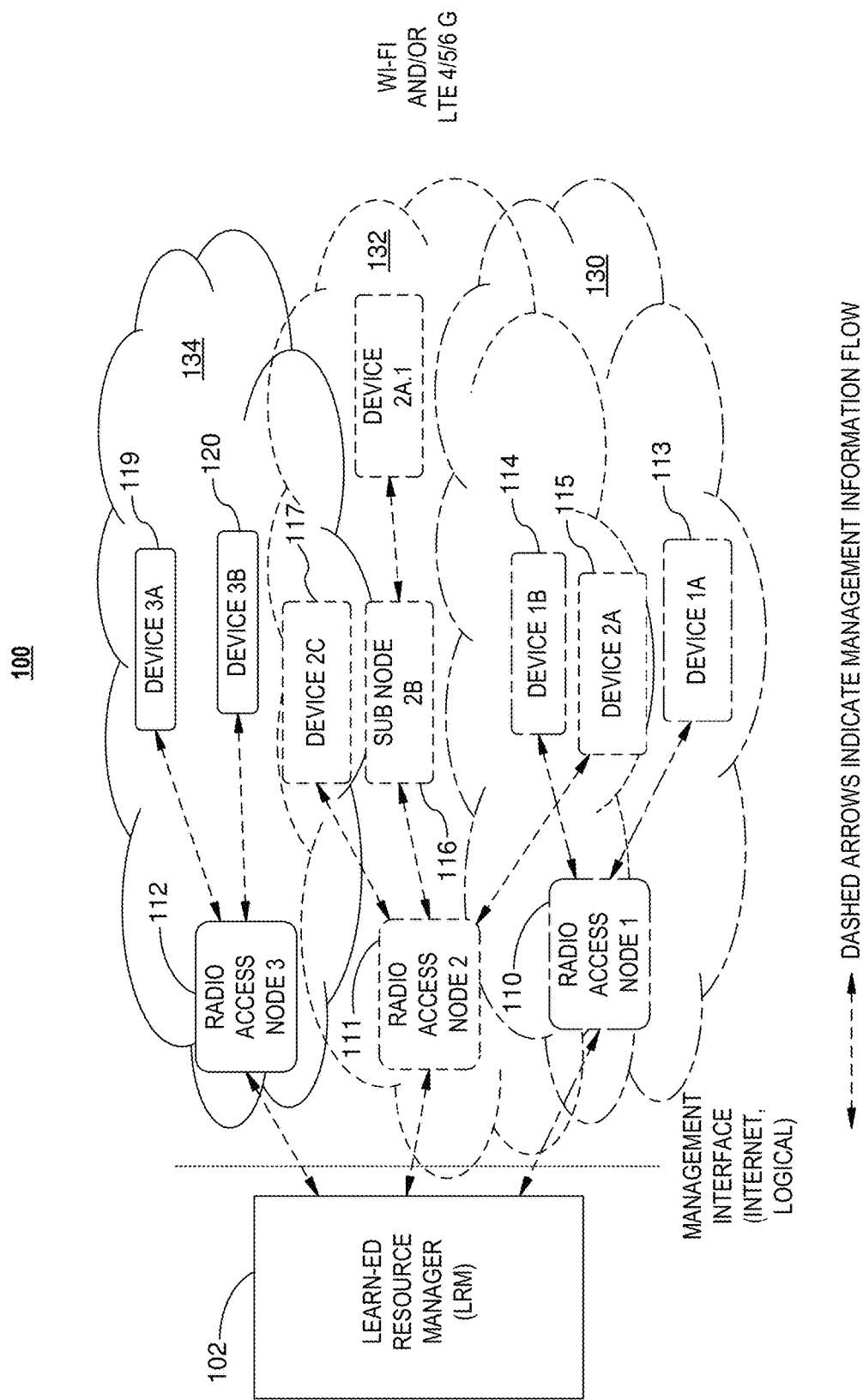
FIG. 1 illustrates an ESM system architecture according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably.

It shall be noted that: (1) certain steps may optionally be performed; (2) steps may not be limited to the specific order set forth herein; (3) certain steps may be performed in different orders; and (4) certain steps may be done concurrently.

It shall also be noted that although certain embodiments described herein may be within the context of wireless communication networks, aspects of the present disclosure are not so limited. Accordingly, the aspects of the present disclosure may be applied or adapted for use in wireless communication networks and other contexts.

In this document, "MIMO" refers to Multiple Input Multiple Output systems and systems with several antennas per user. Orthogonal Frequency Division Multiplexing (OFDM) refers to a system that uses equal energy on all of a set of adjacent frequency dimensions that often appears in wireless communication standards like Wi-Fi and LTE. The term "instantaneous" may be used interchangeably with the term "measured." A group of channels may be referred to as "band" and may be labeled with the same or similar indices. It is noted that different symbols and labels may be used to annotate similar variables in certain sections of this document. For example, E and ε are used interchangeably to denote energy. In certain sections, the following notations is used:

Γ: Gap to the capacity
N: number of sub-carriers
$E_{tot}$: total energy
$E_i$: energy at sub-carrier i
$h_i$: gain for sub-carrier i
$N_i$: Noise at sub-carrier i
$I_i$: Interference at sub-carrier i
$SINR_i$: signal-to-interference-plus-noise ratio $$SINR_i = \frac{E_i h_i}{I_i + N_i}$$

Then, geometric SINR is $$SINR_{geo} \approx [\Pi_i SINR_i]^{\frac{1}{N}} = E_{[tot]} * g_{geo}$$

and the optimal bit-per-subcarrier is $$N * \log_2(1 + SINR_{geo}) \approx N * \log_2\left(1 + [\Pi_i SINR_i]^{\frac{1}{N}}\right)$$

SNR=signal-to-noise ratio
$SINR_{geo}$ represents the geometric SNR in the single-carrier system and may be the normal single-carrier (equalizer output if used) SNR
$g_{geo,k}$=effective channel gain of channel k It is noted that any headings used herein are for organizational purposes only and shall not be used to limit the scope of the description or the claims. All documents cited herein are incorporated by reference herein in their entirety.

1. Introduction

Statistical consistency, or ergodicity, has enabled averaged wireless-design analysis and performance projection for several wireless-network generations to date. Such averaged analysis permits link budgets, data rates, and corresponding transmission ranges to be estimated. The ergodic analysis is used while actual transceiver designs are based on instantaneous transceiver training/pilot packets, initially, and usually interpolated thereafter. The average over the ergodic distributions from which channel conditions are sampled then presume the corresponding instantaneous' designs use for each channel instance.

ESM method presented herein learn and exploit near-ergodicity or consistent use patterns to improve connection stability and efficiency in use of time, spectrum, and space. ESM may simplify determination of some decoupled cloud-based delay-insensitive spectra-assignment and modulation-coding choices through artificial intelligence and learning methods for RRM.

Also important to ESM's distinction from earlier RRM/DSM is the concept of Quality of Experience (QoE) relative to Quality of Service (QoS). QoE is measured by the connection user's contentment, often through promoter scores, complaint rates, corrective-action costs, or simple service churn (cancellation) of service. QoS is measured in probability of bit/packet errors, latency, and achieved data rates. The two measures need not be well correlated. For instance, a very good QoS may occur most of the time/use, but outages may nonetheless occur in situations readily noticed by users and thus lead to poor QoE. Alternately, some links may have good QoE even if the QoS levels are below some proscribed levels, depending on the user, place, time, and application being used. ESM can address QoE more directly, while RRM/DSM addresses QoS.

FIG. 1 illustrates an ESM system architecture according to embodiments of the present disclosure. Learn-ed Resource Manager (LRM) 102 in ESM system 100 introduces the ability to learn and exploit any statistical consistency. ESM's LRM 102 can guide such RRM decisions by providing functional description on statistical consistencies of the various cell uses and dynamics. It is noted that LRM 102 is called "learn-ed" resource manager to emphasize that it both learns and is considered an intelligent resource due to its ability to perform functions of a "teacher."

FIG. 1 shows 3 radio nodes 110-112 and their sub-nodes and/or devices 113-119. Each radio node's coverage area 130-134 has its own "color" (indicated by the line type surrounding that area) for any spectra it may actively use, and dimensional uses may overlap between radio nodes (or colors) 110-112, corresponding to interference between different nodes' signals. Devices 114, 115, and 117 experience interference, which RRM/ESM attempts to reduce or eliminate.

In embodiments, sub-nodes/devices 113-119 may collect and process any resource-related data, such as effective (i.e., geometric averaged) channel gain data, g, that may be communicated to LRM, which may collect the data, e.g., for different channels, and parameters. As discussed in greater detail with reference to FIG. 3 and FIG. 8, in embodiments, LRM 102 uses some or all of the data to generate, based on ergodic analysis, a policy (or function) and communicates the policy/function to nodes/devices 110-119, e.g., in a tabular format or any other mathematical notation. Once nodes/devices 110-119 obtain a policy/function, they may measure instantaneous parameters, such as g, and apply the measured values to a function to obtain RRM parameters that, ideally, work best for the current g. The term "ergodic" formally means that time averages are equal to statistical averages. As used herein, the term ergodic more loosely describes that certain consistencies recur. These consistencies may depend on a state of a channel, noises, and interference. Thus, consistent but not necessarily the same behavior is expected in each state. The current state is determined locally, but the set of possible states and their corresponding spectra, constellation sizes, and code parameters may be guided by a cloud server, which in FIG. 1 is represented by LRM 102. Ergodic approaches estimate the (possibly state-dependent) probability distribution of what herein is called channel gains $g_n$, formally defined in Section 2 below. A certain distribution's consistency is determined to assist ESM guidance provided to locally implemented RRM. Section 2 also develops a geometric-equivalent model for channel gains that correspond to wireless systems' present-day use of channels (often themselves comprised of many tones using single-user-focused so-called "orthogonal-frequency-division multiplexing" modulation systems). Section 2 also largely decouples spectra decisions from code/rate choices to simplify the complexity challenges.

Section 2 also briefly reviews known concepts in ergodic loading for single users in preparation for a discussion of multi-user embodiments in Section 3. Section 2 shifts emphasis from traditional RRM wireless' systems design that depends on instantaneous channel gains to ESM's learned probability distributions and correlations of these channel gains that instead guide RRM decisions. In ESM, the distributions of the other users' channel gains become mutually dependent in a jointly controlled manner when possible and prudent. Section 3 develops intuition around these dependencies and defines 3 stages of increasing ESM sophistication that may help guide EMS's incremental introduction into legacy networks as well as future networks with greater tunability. A few simplified examples illustrate ESM's gains with respect to the contention-based approaches typically used in unlicensed spectra. These stages will roughly parallel 3 DSM "levels" previously proposed and later used successfully to advance fixed-line speeds and efficiencies by large improvements. Section 4 augments ergodic-spectra guidance with QoE-influenced additional functional-choice specification of the modulation and coding-system (MCS) parameters by expanding traditional outage-probability metrics and mechanizing them with Markov models as adaptively learned and output-optimized. Some simplified distribution estimation and various methods for estimation and ESM's use of QoE metrics are described. Section 5 provides some examples of correspondingly large potential ESM gains in QoE, while Section 6 concludes.

2. Resource Dimensionality, Loading, and Statistics

Dimensions in modern wireless communication networks can traditionally occur in time and frequency, but also increasingly in space where increasing numbers of antennas are used to improve system performance. A dimension may be thought of as a time slot, a subcarrier/tone, or a spatial dimension. For example, in wireless transmission that uses base quadrature modulation on each dimension, a dimension may be viewed as a complex dimension or as two real dimensions.

Generally, dimensions may be viewed as system resources. Dimensional resources may be equally partitioned, e.g., rather than being specifically associated with time, frequency, or space. A finite number of space/time/frequency dimensions per symbol, and transmissions of successive symbols may be presumed. In some scenarios, such presumption involves the presence of an overall ESM symbol clock that may be approximated and become more exact in sophisticated highest-gain scenarios. ESM's resource partitioning may shift from an all-dimensions-are-equal deterministic view to a statistical view based on the probability that the dimensional resource is useful. Several examples herein illustrate ESM's improvement upon collision-detection methods and, in some cases, on deterministic RRMs that allow single-user ergodic approaches to be applied to multi-user cases.

2.1 Multi-Dimensional Channel Generics

The term "loading" herein refers to the assignment of energy and information (a sub-function of coding and modulation) to a channel's possibly variable-quality dimensions that may not necessarily all have the same gain and noise. Variable quality may be viewed as "time-variant," "frequency-selective" channel filtering, or as different gains on different spatial paths, etc.

Figure 2:
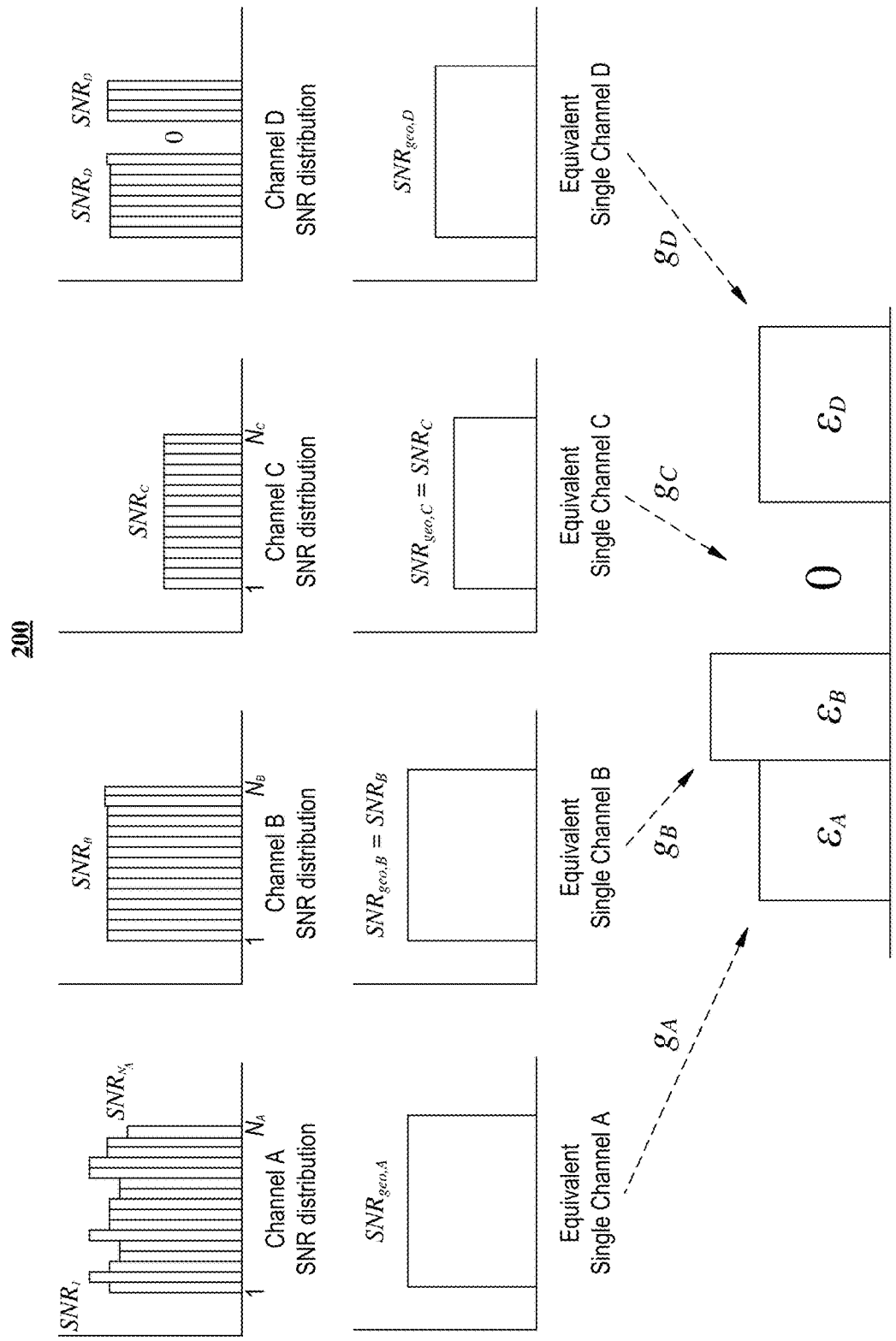
FIG. 2 illustrates four single-user channels that each may have several "dimensions," according to embodiments of the present disclosure.

FIG. 2 illustrates four single-user channels that each may have several "dimensions," according to embodiments of the present disclosure. Dimensions may have different gain and noise. As shown in the second row in FIG. 2, ESM oftentimes represents a channel by an equivalent constant dimension that is repeated a number of times per symbol, which in turn may be generalized into a probability that a certain type of dimension/resource is available. As depicted in FIG. 2, Channel A uses variable energy on the dimensions to maximize performance; Channel B and Channel C use equal energy on all dimensions and have each different total energy. Channel D uses equal energy and zero energy on its dimensions. In embodiments, Channel A may be representative of a massive MIMO system with many spatial channels that each has different gain and SNR, or a system that has several antennas per user. Channel A may also correspond to the frequency dimensions of a wireline system. Other types of communication links might also produce Channel A. Channels B and C may be wireless Coded-OFDM systems that use a constant energy on all subcarriers within a specific channel. Channel D may correspond to a wireless system that aggregates two channels for transmission that are perhaps not contiguously located in frequency. Channel D may also represent 4 spatial streams, of which 3 are used. Any dimension may have an SNR defined by $$SNR \triangleq \bar{\varepsilon} \cdot g \qquad \text{(Eq. 1)}$$

where $\bar{\varepsilon} = \varepsilon/N$ is the average transmit energy used on the dimension, $\varepsilon$ is the total energy used over N dimensions, and g is the "channel gain" that may represent the channel energy gain/attenuation normalized to the dimensional noise energy. For FIG. 2, $\varepsilon = \varepsilon_A + \varepsilon_B + \varepsilon_C + \varepsilon_D$ and $N = N_A + N_B + N_C + N_D$. Loading decides the transmit energy assigned to each dimension. There may be any number of loading criteria resulting in variable or flat energy distributions. Gain g is a function of the given channel and typically cannot be directly changed (by the designer) and is viewed as random in ESM. The gain's denominator noise though may comprise interference from other users that may indirectly then be affected by earlier ESM policy recommendations. The maximum bit rate b for such a channel is known to be $$\bar{b} = \log_2(1+SNR) \qquad \text{(Eq. 2)}$$

where the per-dimensional quantity $\bar{b}$ is computed from the total number of bits b that are transmitted over N dimensions as $\bar{b} \triangleq b/N$. For FIG. 2, $b = b_A + b_B + b_C + b_D$. For any energy on a channel's dimensions, this distribution and channel may be represented by an equivalent geometric single-SNR channel that has the same information-bearing capacity $\bar{b}$. That equivalent SNR is given, for example for Channel A (with $SNR_{n,A}$ being the SNR for dimension n of Channel A), by (with good capacity-achieving codes implied)

$$SNR_{geo,A} = \left[\prod_{n=1}^{N_A}(1+SNR_{n,A})\right]^{1/N_A} - 1 \qquad \text{(Eq. 3)}$$

Since good loading methods will typically not assign energy to channels (or dimensions) where the SNR is not significantly greater than 1, Eq. 3 is often approximated by dropping the 1 terms; then appearing exactly as the geometric SNR equal to the $N_A^{th}$ root of the product of the $N_A$ constituent dimensional SNR's. In embodiments, by assigning constant energy $\varepsilon_A$ to the equivalent channel in $N_A$ instances, the channel gains, here, the effective channel gain of channel A, may be represented by their geometric average as $$g_{geo,A} = \left[\prod_{n=1}^{N_A} g_{n,A}\right]^{1/N_A} \qquad \text{(Eq. 4)}$$

and thus $$SNR_{geo,A} = \bar{\varepsilon}_A \cdot g_{geo,A} \qquad \text{(Eq. 5)}$$

As FIG. 2 illustrates, a nested-loading problem can now be solved for the constant energy assigned to each channel (as if it were a single "wider" dimension), and an overall aggregate geometrical SNR may present the channel set as:

$$SNR_{geo} = (1+SNR_{geo,A})^{N_A/N} \cdot (1+SNR_{geo,B})^{N_B/N} \cdot (1+SNR_{geo,C})^{N_C/N} \cdot (1+SNR_{geo,D})^{N_D/N} - 1 \qquad \text{(Eq. 6)}$$

Eq. 6 can be accurately approximated by dropping all the 1 terms if $SNR_{geo,X} \gg 1$ for X=A, B, C, D, while only including loaded channels. Since, as shown in FIG. 2, $SNR_{geo,C}$ is not loaded (zero energy is assigned), channel C's 1 term should not be ignored, and consequently that term then trivially exits the formula in Eq. 6. In embodiments, the overall nested loading problem assigns constant (or zero) energy to the geometric-equivalent channels' dimensions (and possibly different energy to different geometric-equivalent channels). The channels' dimensions relative to the total $$N, \left[\frac{N_A}{N} \; \frac{N_B}{N} \; \frac{N_C}{N} \; \frac{N_D}{N}\right],$$

may be viewed as a discrete probability distribution. Further, $(N^*_X/N)$ where X=A, B, C, D may be viewed as the average probability that a certain resource (dimension) is used. The values in the distribution represent the probability that a dimension appears in a certain channel. Roughly speaking, this probability corresponds to the likelihood that a certain channel "resource" is available to be used. After such a reduction, the probability trivializes and is essentially independent of the channel gains (and thus noises).

In embodiments, the concept may be generalized to correspond to the probability that a certain channel resource is available, taking into an account fading, gains, interference from other users, noises, etc. This conceptual interpretation may be particularly useful in ESM when the probability of certain channel conditions is known or can be estimated. In embodiments, the concept may be expanded to ergodic loading (discussed below) and also may serve as the foundation for a multi-user extension of ergodic loading in ESM, discussed in greater detail in Section 3.

ESM channels in FIG. 2 may be considered different channels in an IEEE 802.11-series Wi-Fi system (each typically 20 MHz wide, or power-of-2 multiples of 20 MHz) or in same-frequency-bandwidth transmission systems. In LTE, these are known as resource blocks or resource units, typically corresponding to 12-tone groups of a Coded-OFDM system over certain time slots of duration 0.5 ms, usually containing 6 or 7 successive OFDM symbols. The system might even combine a fixed-line DSL Discrete MultiTone (DMT) or DOCSIS 3.1 Coded-OFDM system with wireless channels, with the former themselves each viewed as channels. In effect, the aggregate forms a "channel of channels." Narrowband low-power-wireless-area-networks (LPWANs) could also be considered each as a channel in this context. LPWANs may include wireless systems, such as Bluetooth, LTE-M's narrowband IoT (Internet of Things), or LoRa (long range). In this context, dimensions are probabilistically weighted partitions of resources. Each base unit of a partition may correspond to a certain single least common divisor use of time, frequency, and space over all channel resources. It is understood that different probabilities may scale with the number of such base units.

2.2 Water-Filling as a Dimension-Management Tool

Water-filling involves energy allocation to a set of parallel independent channels (or dimensions). A water-filling distribution's energy assignment per channel may be expressed as $$\bar{\varepsilon}_n + \frac{\Gamma}{g_n} = K \quad \text{(Eq. 7)}$$

where $\bar{\varepsilon}_n$ is the energy on the $n^{th}$ channel. Herein, channel refers to "dimension," a set of dimensions as in FIG. 2's nested loading, or the base-unit dimension for the tones/slots of a single channel. The "coding-gap" parameter $\Gamma$ characterizes the applied code's capability, with $\Gamma=1$ (0 dB) implying a capacity achieving code is used. It is noted that Eq. 3 through Eq. 6 assume $\Gamma=1$. K is the water-level constant, and the $n^{th}$ channel (or dimensional) gain is defined by $$g_n \triangleq \frac{\text{channel energy amplification/attenuation}}{\text{sum of all noises}} \quad \text{(Eq. 8)}$$

where the "noises" may include interference, e.g., interference from other users who attempt to use that same channel at the same time. Channel amplification/attenuation is the respective squared increase/decrease in the transmitted signal to its noise-free component at the receiver input. Water-filling essentially says that the sum of the energy and the inverse gain is constant on all used sub-channels. The inverse gain involves "noise on the output referred to the channel input." The term used is italicized because water-filling will zero certain channels as being unable to solve Eq. 7 with positive energy. Normal water-filling will order the $\{g_n\}$ from largest (n=1) to smallest (n=N) and choose the largest N*, such that in order to maximize data rate or total bits carried, b, the equation $$K_{RA} = \frac{\varepsilon}{N^*} + \frac{\Gamma}{N^*} \cdot \sum_{n=1}^{N^*} \frac{1}{g_n}$$

is satisfied with all non-negative energies, and $$\varepsilon = \sum_{n=1}^{N} \varepsilon_n$$

is the total energy allowed. Water-filling can be viewed with the ordered set of channel gains as the transmit per-dimension rule of "transmit if good enough" (with $\gamma_0 \triangleq \Gamma/K$) or $$\begin{cases} g_n > \gamma_0 & \text{transmit at energy } \varepsilon_n = K - \frac{1}{g_n} \\ g_n \leq \gamma_0 & \text{do not transmit, so } \varepsilon_n = 0 \end{cases} \quad \text{(Eq. 9)}$$

The rate-adaptive (i.e., the criterion is to maximize the data rate given fixed total energy) water-level constant $K_{RA}$ may also be viewed as the sum of the used-dimension average energy $$\langle \varepsilon^* \rangle \triangleq \varepsilon/N^* = \left(\frac{N}{N^*}\right) \cdot \bar{\varepsilon} \ (\bar{\varepsilon}$$

is the energy per dimension, so with N*<N the water-fill loading process increases energy on average for the better used dimensions) and the gap-scaled average inverse gain $$\left\langle \frac{1}{g^*} \right\rangle \triangleq \frac{1}{N^*} \cdot \sum_{n=1}^{N^*} \frac{1}{g_n},$$

so $$K_{RA} = \left\langle \varepsilon^* + \Gamma \cdot \frac{1}{g^*} \right\rangle \quad \text{(Eq. 10)}$$

The dimensional average that may be viewed here as "ergodic average" uses angle brackets to indicate averaging are over time, space, or frequency and do not correspond to averages over the channel input or noise distributions. A useful water-filling interpretation is that the transmit energy on any used dimension exceeds (or deceeds) the average transmit energy by an amount that is equal to the amount by which the channel gain deceeds (exceeds) the average channel gain or (with unit gap or perfect codes):

$$\varepsilon_n - \langle \varepsilon \rangle = \left\langle \frac{1}{g} \right\rangle - \frac{1}{g_n} \quad \text{(Eq. 11)}$$

When the channel gains $\{g_n\}$ are viewed as random, with each value in each index (dimension) having probability $$Pr\{g_n\} = \begin{cases} \frac{1}{N^*} & n = 1, \ldots N^* \\ 0 & n = N^* + 1 \ldots N \end{cases},$$

then $\langle \varepsilon^* \rangle$ and $$\left\langle \frac{1}{g^*} \right\rangle$$

would correspond to the averages over this indexed/dimensional distribution. Similarly, to minimize energy for a given data rate or total bits over all channels, dual margin-adaptive (MA) water-filling instead chooses the largest N* such that $$K_{MA} = \Gamma \cdot \frac{2^{b/N^*}}{\sqrt[N^*]{\prod_{n=1}^{N^*} g_n}}$$

is satisfied with all non-negative energies. By defining $$\langle b^* \rangle = \left(\frac{N}{N^*}\right) \cdot \bar{b} \text{ and } g_{geo} = \sqrt[N^*]{\prod_{n=1}^{N^*} g_n},$$

this MA water-level constant can be also written as $$K_{MA} = \Gamma \cdot \frac{2^{\langle b^* \rangle}}{g_{geo}} \quad \text{(Eq. 12)}$$

These water-filling formulas presume the (single-user) RRM knows the channel gains instantaneously and accurately at both the transmitter and the receiver, and the statistical interpretation just appears superfluous, as yet.

2.3 Ergodic Water-Filling

In embodiments, ESM guides loading decisions through a statistically based function of the instantaneously measured channel gain (or gains). The LRM may compute the probability distribution over the channel gains, as $p_g$, over a discrete set of gain values (ranges), $\mathscr{G} = \{g\}$. The instantaneous geometric-average channel gain value, $g_{geo,X}$, for $X \in \{A\ B\ C\ D\}$ may also be all that is known at the local radio node's transmitter, e.g., via an initial training process for each channel used or very recent history. The value of the instantaneous transmitted packet $g_{geo,X}$ is often fed back (as "channel state information" CSI) to the transmitter through a training protocol, often called channel sounding, using what Wi-Fi, for instance, calls an NDP (null data packet). LTE runs continuously on the channel with the channel gains instead interpolated from embedded training pilots that basically range through the used channels. The energy transmitted for a specific value g is $\varepsilon_g$. A typical ergodic water-filling solution generalizes for a discrete distribution to maximize the average data rate $$\langle b \rangle = \sum_{g \in \mathscr{G}} p_g \cdot \log_2(1 + \varepsilon_g \cdot g) \quad \text{(Eq. 13)}$$

subject to an average energy constraint of $$\varepsilon = \sum_{g \in \mathscr{G}} p_g \varepsilon_g \quad \text{(Eq. 14)}$$

where $p_g$ is the probability of gain g. Maximization of Eq. 13 leads to the ergodic water-filling constant $$K_{RA} = \frac{\varepsilon}{\sum_{g \in \mathscr{G}^*} p_g} + \frac{\Gamma}{\sum_{g \in \mathscr{G}^*} p_g} \cdot \left(\sum_{g \in \mathscr{G}^*} \frac{p_g}{g}\right) \quad \text{(Eq. 15)}$$

where $\mathscr{G}^*$ is the largest set of the (ordered again from largest to smallest) gains' range values for the discrete distribution for which all energies in Eq. 10 are non-negative. The ergodic water level generalizes RRM's uniform distribution over the used channels and replaces it by a more general distribution $p^*_g$ over the used channels that have sufficiently large gain, but then otherwise retains Eq. 10. Ergodic water-filling replaces the deterministic resource index n by the channel gain value g. However, ESM also requires the instantaneous channel gain to be known locally at the transmitter and also follows Eq. 9 or also Eq. 11. Essentially, ergodic water-filling differs from normal water-filling in the calculation of water-fill constant K.

2.3.1 Outage Probability and Loading for Ergodic Channels

When the spectra/channels' energies are determined, the traditional-RRM radio node locally decides two code parameters that are the constellation size |C| (nominally chosen from among BSPK, 4QAM, 16QAM, 64QAM, ..., 4096QAM) and code rate r (typically, code rates are simple fractions like ½, ⅔, ..., i/i+1 created by puncturing a rate ½ convolutional code to have less redundancy (more generally, numbers between 0<r≤1 when more general LDPC, Polar, or other codes are used). With reasonable code decisions (fixed gap), the water-filling spectrum decisions are independent of the code choice. When the code is capacity achieving, then the data rate is simply determined by the well-known $\log_2$ (1+SNR) formula; but for realistic codes a code rate and constellation size may be estimated for each channel with constant SNR over the band. A possible local radio-node Quality of Service (QoS) objective for [r |C|] is effectively equivalent to the following problem statement:

$$\max_{r,|C|,\gamma_0} b \triangleq r \cdot \log_2|C| \quad \text{(Eq. 16)}$$

subject to: $\langle P_e \rangle < \delta$ and $P_{out} \leq 1 - r$ where, for instance on a channel with additive white Gaussian noise, the average probability of symbol error is (limited by a specified maximum tolerable level $\delta$)

$$\langle P_e \rangle \triangleq \sum_{g > \gamma_0} p_g \cdot \bar{N}_e \cdot Q\left[\sqrt{\frac{3 \cdot \varepsilon \cdot g \cdot d_{free}(r)}{|C| - 1}}\right] \quad \text{(Eq. 17)}$$

and the probability of outage is $$P_{out} \triangleq \sum_{g \leq \gamma_0} p_g \quad \text{(Eq. 18)}$$

The code distance profile versus rate, $d_{free}(r)$, is known for codes allowed in the radio node. The parameter $\gamma_0$ on the sums is chosen to satisfy both Eq. 17 and Eq. 18. Eq. 17 admits also an overall data-rate ordering $b = r \cdot \log_2(|C|)$ that can be checked to solve the QoS optimization problem by successively testing this ordering's overall optimized data rate in Eq. 16 until the performance objectives in Eq. 17 and Eq. 18 are met.

2.3.2 Nesting with Ergodic Water Filling

Nested loading with ergodic water-filling presumes that a geometric average channel gain is available locally (at the radio node) for each channel and for its corresponding packet and/or "time slot." Thus, the lowest level loading is performed locally in the radio node. The ergodic decision then simply becomes "use or don't use" a certain channel at a certain time, along with the energy level to use that is based on the instantaneous measured channel gain. For a single user, this is relatively simple. Section 3 will progress to multiple users where the joint probability distributions tacitly (Stage 1 ESM, see Section 3) or explicitly (Stage 2 ESM, Section 3) will be needed to create a useful multi-user form of ergodic water-filling. Again, there is a level of local deterministic water-fall that underlies an overall averaging.

In ESM, the local transmitter will know only the gain for its own channels $X \in \{A\ B\ C\ D\}$, and the LRM will know the distribution of such values, but not the instantaneous values. The LRM will provide guidance, or policy, to the local transmitter of energy use and code use as a function of the locally measured gain value, $\varepsilon_g$, which essentially amounts to the water-fill constant in the simple cases viewed so far.

Eq. 15 can be rewritten, by defining the probability $$P^*_{geo} = \left( \sum_{g \in \mathcal{G}} p_g \right)$$

that spans only used resources, as indexed through the channel gain (or inverse gain), as $$K_{RA} = \left( \frac{1}{P^*_{geo}} \right) \cdot \varepsilon + \Gamma \cdot \left\langle \frac{1}{g^*} \right\rangle \quad \text{(Eq. 19)}$$

with the distribution on the used set $\{g \in \mathcal{G}^*\}$ defined as $$p^*_g \triangleq \frac{p_g}{\sum_{g \in \mathcal{G}^*} p_g} \forall g \in \mathcal{G}^* \quad \text{(Eq. 20)}$$

The ergodic water-fill factor $$\left( \frac{1}{P^*_{geo}} \right)$$

in Eq. 19 is similar to the factor $$\left( \frac{N}{N^*} \right)$$

in (non-ergodic) water-fill and corresponds again to better resources getting the available energy. The energies are again determined, now indexed by $g$, as $$\varepsilon_g = K_{RA} - \frac{\Gamma}{g} \forall g \in \mathcal{G}^* \quad \text{(Eq. 21)}$$

In practice, the usable range of energies is typically close to on/off as in (non-ergodic) water-filling. The LRM cannot know the current instantaneous $g_{geo}$ value. For a single user, the decision of energy and coding parameters to be used may be guided by the LRM through ESM's functional specification, or set of spectra/codes for each locally measured geometric channel gain. Thus, while feedback of instantaneous $g$ values for each dimension is impractical, the LRM knows and specifies the set $\{g_{geo}\}$ of possible values. For instance, for FIG. 2's channels $X = A$, B, C, and D, at a certain time of day in a certain location (or user). These are the locally measured $g_{geo,X}$ that are the inputs to the LRM's provided function. If the average bit rate is fixed in Eq. 13, there is a corresponding dual ergodic water-filling solution for minimum average energy where (with $$\langle b^* \rangle \triangleq \langle b \rangle / P^*_{geo})$$

$$K_{MA} = \Gamma \cdot \left( \frac{2^{\langle b \rangle}}{\prod_{g \in \mathcal{G}^*} g^{p_g}} \right)^{1/\sum_{g \in \mathcal{G}^*} p_g} = \Gamma \cdot \left( \frac{2^{\langle b^* \rangle}}{g_{geo}} \right) \quad \text{(Eq. 22)}$$

ESM generalizes the concept of resource use from the fraction of used dimensions to a probability distribution, and when nesting loading over many channels, $N_X/N \rightarrow p_{geo,X}$, ESM transforms the overall SNR in Eq. 6 into $$SNR_{geo} = (1 + SNR_{geo,A})^{p_{geo,A}} \cdot (1 + SNR_{geo,B})^{p_{geo,B}} \cdot (1 + SNR_{geo,C})^{p_{geo,C}} \cdot (1 + SNR_{geo,D})^{p_{geo,D}} - 1 \quad \text{(Eq. 23)}$$

While these generalizations may as yet appear superfluous for a single user, they become more helpful to comprehend their alternatives in Section 3's ESM multi-user case.

2.4 Probability Distribution Estimation

This section discusses methods for single-user (Subsection 2.4.1) and multi-user (Subsection 2.4.2) channel probability-distribution estimation. The single-user distribution may be used in single-user ergodic water-filling. Multi-user distribution may be used in connection with embodiments discussed in Section 3 below.

2.4.1 Estimation of a Single-User Probability Distribution

In embodiments, a probability-distribution estimation for a single-user channel is used in single-user ergodic water-filling. Channel gains $g_{geo,X}$ may be continuously distributed between 0 (i.e., channel is unusable) and some number. The range of gain values may be discretized for ESM (e.g., by using Eq. 17) by looking at the minimum gain levels necessary at a presumed nominal transmit power spectral density, $\bar{\varepsilon}$, and target random-error probability level (e.g., $p = 10^{-7}$) as per $$\frac{[Q^{-1}(p)]^2 \cdot (|C| - 1)}{3 \cdot \bar{\varepsilon} \cdot d_{free}(r)} = g \quad \text{(Eq. 24)}$$

according to the allowed values for [r |C|] for a given code, where free-distance, $d_{free}(r)$, is given as a function of rate for some known applied code(s). In embodiments, the inverse of the Q-function may be obtained from tabulated values. In embodiments, solutions of Eq. 24 may provide endpoints for successive gain regions. The endpoints may be characterized or represented by the lowest gain value at the region's lower boundary. In embodiments, each of these ranges may correspond to certain interference situations (e.g., different sets of other active users, as in the EIW example in Section 3) or to the channel's attenuation that may vary with user, environmental conditions, or both. For ESM, each of these gain ranges may correspond to the current measured values of $g_{geo,X}$ for a different channel X that is reported to the LRM. In embodiments, the gains may create a range segment $$\mathcal{G}_{i,X} = \{g | g_{i,X} \leq g < g_{i+1,X}\} \quad \text{(Eq. 25)}$$

where $g_{0,X}=0$. The measured set of all $\{g_{geo,X}(k)\}$ (k being an observation interval index) for a certain channel X may have a size $|\mathcal{G}_{i,X}|$ that represents the total number of measurements for that channel. Each of the sets may have a size $|\mathcal{G}_{i,X}|$ that equals the number of measurements that fall into range segment $\mathcal{G}_{i,X}$. Given a number of measurements for each channel, a gain distribution may be computed from the set of measured gains $g_{i,X}$ for that channel as $$\hat{p}_{g,X} \simeq \frac{|\mathcal{G}_{i,X}|}{|\mathcal{G}_X|} \forall g \in \mathcal{G}_{i,X} \qquad \text{(Eq. 26)}$$

To ensure that distribution-estimation error remains relatively small, in embodiments, the total number of observation intervals may be chosen at least ten times larger than the number of ranges in the discrete distribution $p_g$. If such distributions are computed for different times of day, then this rule should hold true for all such computed distributions individually corresponding to their respective times of day. In embodiments, a good estimate-accuracy measure is that the distribution no longer changes much with additional measurements, i.e., the distribution appears "ergodic." Significant changes occurring after initial convergence for several intervals may signify, for example, that the wireless environment has changed, e.g., by the introduction of a new radio node, or new devices that have changed the environment or movement of the radio node or a subtended device/user. Such movements do not prevent an average ergodic appearance if they are roughly consistent, such as, for example, a movement down a hallway that occurs more often during a certain time of day, or movements by vehicles using the ESM channel spectra fairly consistently. In embodiments, an estimation process may average the distribution over several intervals, e.g., by using a sliding block of intervals that averages the distributions found for each of the intervals within the sliding block. In embodiments, an exponential fading window may update the distribution according to $$p_{g,new}(1-\lambda)\cdot p_{g,old}+\lambda\cdot p_{g,current} \qquad \text{(Eq. 27)}$$

to reduce exponentially and gradually the effect of older data, while higher weight values $\lambda$ ($0\leq\lambda<1$ but typically close to 1) may be applied to newer data. In embodiments, in response to LRM sensing an abrupt change or a consistency that is deemed untrustworthy, ESM guidance may cease to provide functional guidance, e.g., until consistency/ergodicity has been restored. In many situations, the distributions may remain consistent at certain times/places, for example, for indoor networks where most users/devices do not frequently change position, and/or the same positions of use are often also common at certain times of day. Consistent movements may on average degrade channel gains, but the averages may still be consistent and reliable in that degradation.

2.4.2 Estimation of a Multi-User Channel-Gain Vector

In embodiments, the distribution estimation may be extended to a random gain vector g's distribution across all users. Such joint-distribution estimation with reasonably large number of users (even just a few to 10s) may become cumbersome when used with a relatively simple range-segment counting method, because the number of measurements grows exponentially with U using the straightforward counting method applied to a joint distribution $p_{g_1, \ldots, g_U}$. In embodiments, the chain rule of probability $$p_{g_1,\ldots,g_U} = p_{g_U|\{g_1,\ldots,g_{U-1}\}} \cdot p_{g_{U-1}|\{g_1,\ldots,g_{U-2}\}} \cdots p_{g_2|g_1} \cdot p_{g_1} \qquad \text{(Eq. 28)}$$

is utilized to reduce complexity by recognizing that any order of users produces the same product. Indeed, the possible conditional probabilities of one user given any set of the other users are possible according to which users are active at the same time at any observation interval. In Eq. 28, such interpretation provides upon each measurement interval an opportunity to update the entire product (assuming some value for other users' prior conditional probabilities and, similarly, for different other users' post conditional probabilities). In embodiments, the computed joint distribution may be averaged with the last joint distribution computed (sliding block or exponentially windowed). The entire product may be initialized by assuming all users are independent or effectively any users for which there is yet no joint data are independent and simplifying Eq. 28. The probability distribution may be initialized by $$p_{g_1,\ldots,g_U}(\text{initial}) = \prod_{u=1}^{U} p_{g_u} \qquad \text{(Eq. 29)}$$

where only those users who have been active for sufficient number of intervals are included in the product. At any point in time when a $p_{g_u}$ is reported, the LRM may check for all other reported active users at that time to form set $\mathcal{U}_{act}$, and then this reported distribution is the term $p_{g_u} \to p_{g_u|\mathcal{U}_{act}}$ in Eq. 28.

Certain embodiments, consider the correlation between different users' distribution values. For instance, a certain value of channel gain for User 1 may be often (or nearly always) associated with another value for User 2. In products like in Eq. 28, various terms may have values that are nonzero (or significant) only when other users' specific channel gain values occur, and are otherwise zero or near zero for all other combinations. In other words, interference between users may occur in certain pairings or tuples for U>2. The channel-gain value on one user may suggest which other users are active or silent when observed. The set $\mathcal{U}_{act}$ may be one of up to U! possible sets. Each user u may have a probability distribution $p_{g_u|u_{act}}$ function of its gain $g_u$ and other users' $\mathcal{U}_{act} \setminus u$ channel gain values. This function will be zero for all but a few channel-gain vector settings. In embodiments, those non-zero settings correspond to (ergodic) patterns of mutual interference. As will become evident in Section 3, only the LRM may need to know these pairings that may be also a function of the available channels X=A, B, C, D, . . . for each non-zero-probability set. For $g_{u,X}$ values of a particular user u, the corresponding values of $g_{i\neq u,X}$ will thus be known.

3. ESM Stages

Table 1 illustrates ESM progression through increasingly sophisticated stages according to embodiments of the present disclosure.

TABLE 1

ESM Progression Through Increasingly Sophisticated Stages

ESM Stage 1 (Subsection 3.1, IW)
Each RN knows & reports its users' channel gains
LRM distributes energy, code guidance as function of local $g_{geo}$
ESM Stage 2 (Subsection 3.2, ODD guidance)
LRM investigates ODD solutions, along with IW
Functional guidance is on/off, but globally coordinated
ESM Stage 3 (Subsection 3.3, Vectored ESM)
Users report color-indication and measured channel's to LRM
RN's assumed to have more antennas than total users
LRM practices vectored spatial reuse and resource optimization
A common symbol clock is created Better Performance
More Coordination Three ESM stages of increasing cloud-based resource management are summarized in Table 1. Ergodic Iterative Water-filling (EIW) discussed in Section 3.1 is a form of Stage 1 management, where the cloud manager may receive historical channel gain values and time-correlate these individual-user values with those of other users. As discussed in Section 5, gain data may be collected historically with time stamps for each radio node's (RN's) users' and subtended connections. While it may be possible to infer joint channel-gain distributions across multiple radio nodes' connections, the Stage 1 ESM LRM may find the non-zero-probability values of $P_{g_u/u_{e_i}}$ and use the corresponding sets to implement Subsection 3.1's iterative water-filling process to produce a recommended spectrum $\varepsilon_{u,X}$ (g) for each value of g that is communicated by the LRM to the RN for user u. The local RN may otherwise operate mostly independent of the LRM. Individual channel-gain probability distributions may be computed to estimate the probability of data rates achieved and energy levels that can be possibly attempted by different user sets that can arise, as well as average values and percentile performance levels.

Subsection 3.2's Stage 2 ESM more aggressively applies spectral constraints based on joint distributions for RNs with sub radio nodes. Stage 2 ESM uses more sophisticated optimum spectrum balancing methodologies. Stage 2 may better extend also to mesh situations where there are sub radio networks within a given radio nodes coverage, as shown in FIG. 1's middle radio-node coverage. Stage 2 in its full form would result in more complicated multi-user functional guidance to radio nodes. However, embodiments in Subsection 3.2 simplify the guidance to the same or similar level as Stage 1 in the context that Stage 2 solutions select mutually exclusive channel-use patterns. In embodiments, Stage 3 represents a higher-level ability for a neighborhood of radio nodes' spectra use to be additionally well synchronized and coordinated based again on ergodics rather than on instantaneous conditions. In embodiments, Stage 3 vectored ESM may guide and improve RRM across a group of RNs that otherwise individually optimize within their own limits. A Stage 3 system may have radio nodes and devices that have many antennas and can follow (phase lock to) a common symbol clock accurately—their spectra, space, and time use may be yet better coordinated than Stage 1 or Stage 2.

Figure 3:
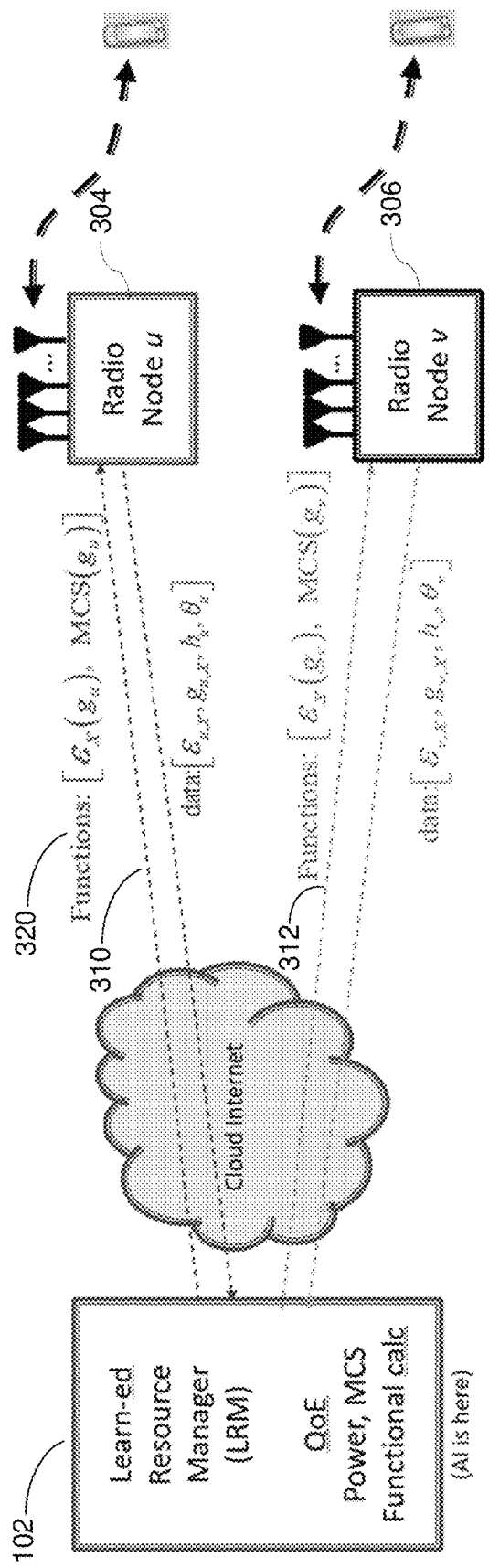
FIG. 3 illustrates management-information flows in any stage ESM ecosystem according to embodiments of the present disclosure.

FIG. 3 illustrates management-information flows in any stage ESM ecosystem according to embodiments of the present disclosure. System 300 may have physically separate radio access nodes 304, 306 that coordinate (for ESM purposes) indirectly through the cloud-based LRM 102. The information provided by radio nodes 304, 306 to LRM 102 may comprise channel gains for any number of subtended connections to devices (or sub radio nodes), any measured interference transfer gains/phases (in Stage 3 ESM), and QoS parameters like times of use, outages, packet errors, previously achieved data rates and corresponding conditions. In embodiments, the information provided by radio nodes to LRM may comprise information to assess QoE, such as user satisfaction, technician visits, and related information. In embodiments, the information to assess QoE may be sent to LRM from sources different from radio nodes, for example, the call center log from a service provider's system. In embodiments, LRM 102 provides to radio nodes 304, 306, e.g., in a tabular format, ESM control information 310, 312 that comprises functions or policies 320, considered guidance for use by radio-nodes 304, 306, of future local-radio-node channel gains. In embodiments, in response to obtaining a function, radio access nodes 304, 306 apply a measured recent parameter, such as geometric averaged channel gain, to the function/policy to obtain one or more parameters that improve performance for the measured parameter. Embodiments in this section illustrate that such guidance may lead to performance improvements when certain ergodic consistencies are present. It is understood that a radio node 304, 306, e.g., upon determining that a fault would occur if the guidance were followed, may over-rule any given guidance 320 and generate an appropriate report to LRM 102.

3.1 Stage 1—Ergodic Iterative Water-Filling (EIW)

Figure 4:
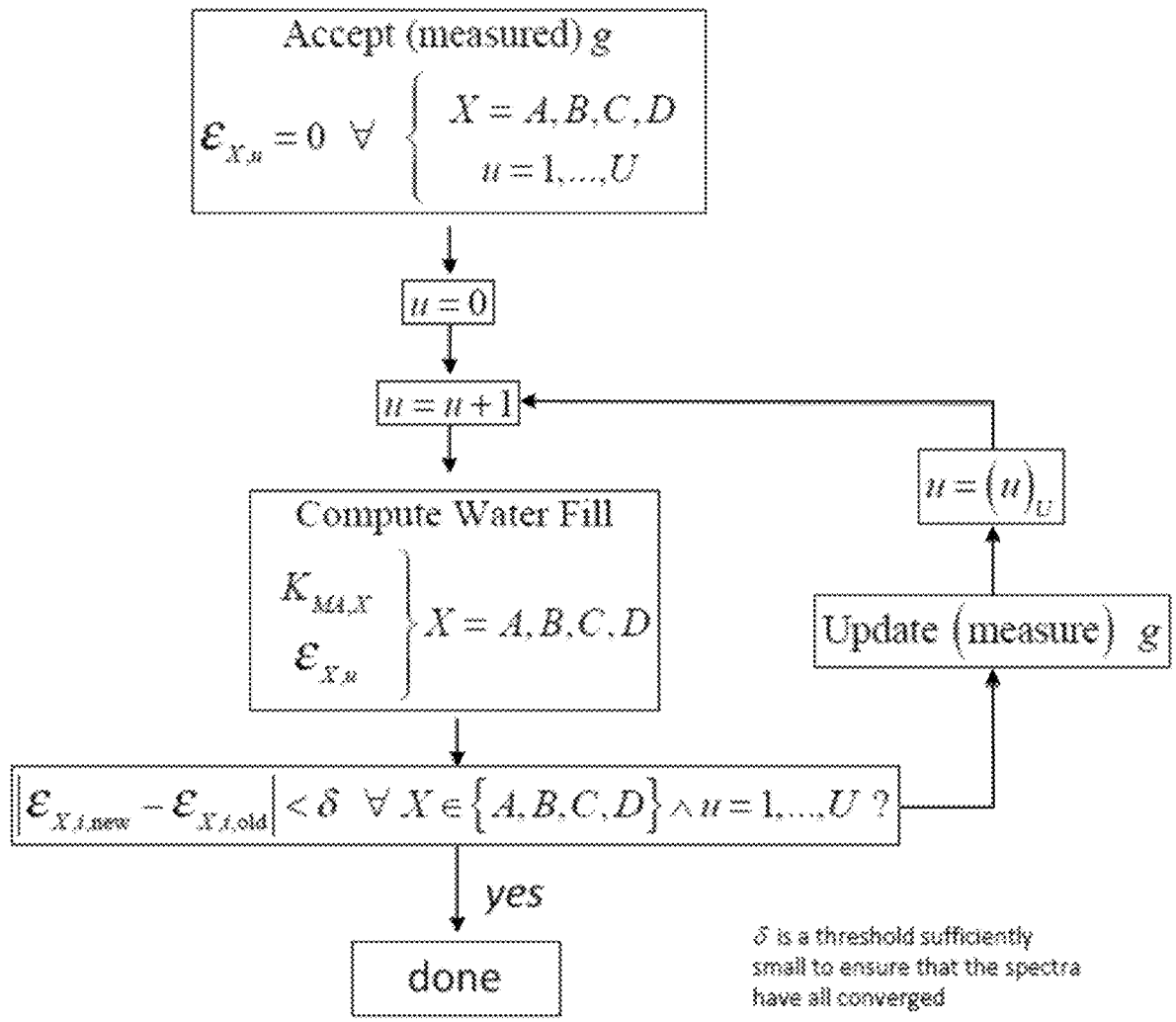
FIG. 4 is a flowchart of an illustrative process for Iterative Water-filling (IW) according to embodiments of the present disclosure.

FIG. 4 is a flowchart of an illustrative process for Iterative Water-filling (IW) according to embodiments of the present disclosure. IW involves several users who each simultaneously single-user practice water-filling in shared channels. It is a deterministic method to reduce the mutual interference between the users. As depicted in FIG. 4, the user index is u=1, . . . , U where U is the number of users. IW may be indirectly a function of all users' gains $\{g_u\}_{u=1, \ldots, U}$, which effect themselves into IW's energy loading through the "noise" that includes other users' interference in a same band (presuming other users' interference cannot be cancelled). In practice, these gains are measured by the wireless radio nodes' equipment and reported to the LRM through low bandwidth cloud/internet feedback. The LRM may determine which sets mutually correspond to non-zero probability and, for each user in such a set, the corresponding water-fill spectra for specific channel-gain values. Due to a delay in reporting a channel-gain value to the LRM, only the specific user device and radio node will know the current gain value. The LRM, however, may compute a distribution from reported values (e.g., by using some of the methods discussed in Section 2.4) and find mutually active sets. Channel gains may be locally computed in the radio node before being reported to the LRM. Iterative water-filling is not guaranteed to always converge although there are numerous cases where it can be mathematically proven to converge and many others where convergence occurs once certain conditions are applied. The convergence point need not be optimum in all cases, but it usually is an improvement over all the users attempting to use all the bands, or all users attempting to completely avoid one another (using collision detection or other fixed assignments of users to channels), as the example below will illustrate.

Various improvements to IW have been proposed, but these approaches increasingly require knowledge of the exact inter-user interference filtering transfer functions (or their equivalents) while IW implicitly measures those users as part of noise in the denominator of g (or interference's impact on the measured probability distribution). Iterative water-filling can essentially be implemented in a nearly distributed fashion where each user's transmissions simply water-fill against the others' sensed interference. However, usually the data rates for each user, as in the components of the vector of different users' data rates $b=[b_1 \ldots b_U]$, are fixed, and then all users implement energy-minimization (MA) water-filling, which tends to prevent any user's data from being zeroed in favor of the rest. This data-rate fixing and imposition of energy-minimization criterion at that data rate is a form of "central control" so there can be, even in IW, some degree of central control, and then IW is not completely distributed. In embodiments, in EIW, users' water-fill computations may be performed or simulated in the LRM, based on common simultaneous occurrences of channel-gains that also may be computed in the LRM from reported (and delayed) values of past $g_{u,x}$. In embodiments, functional guidance may then be returned to radio nodes and their subtended devices.

Figure 5:
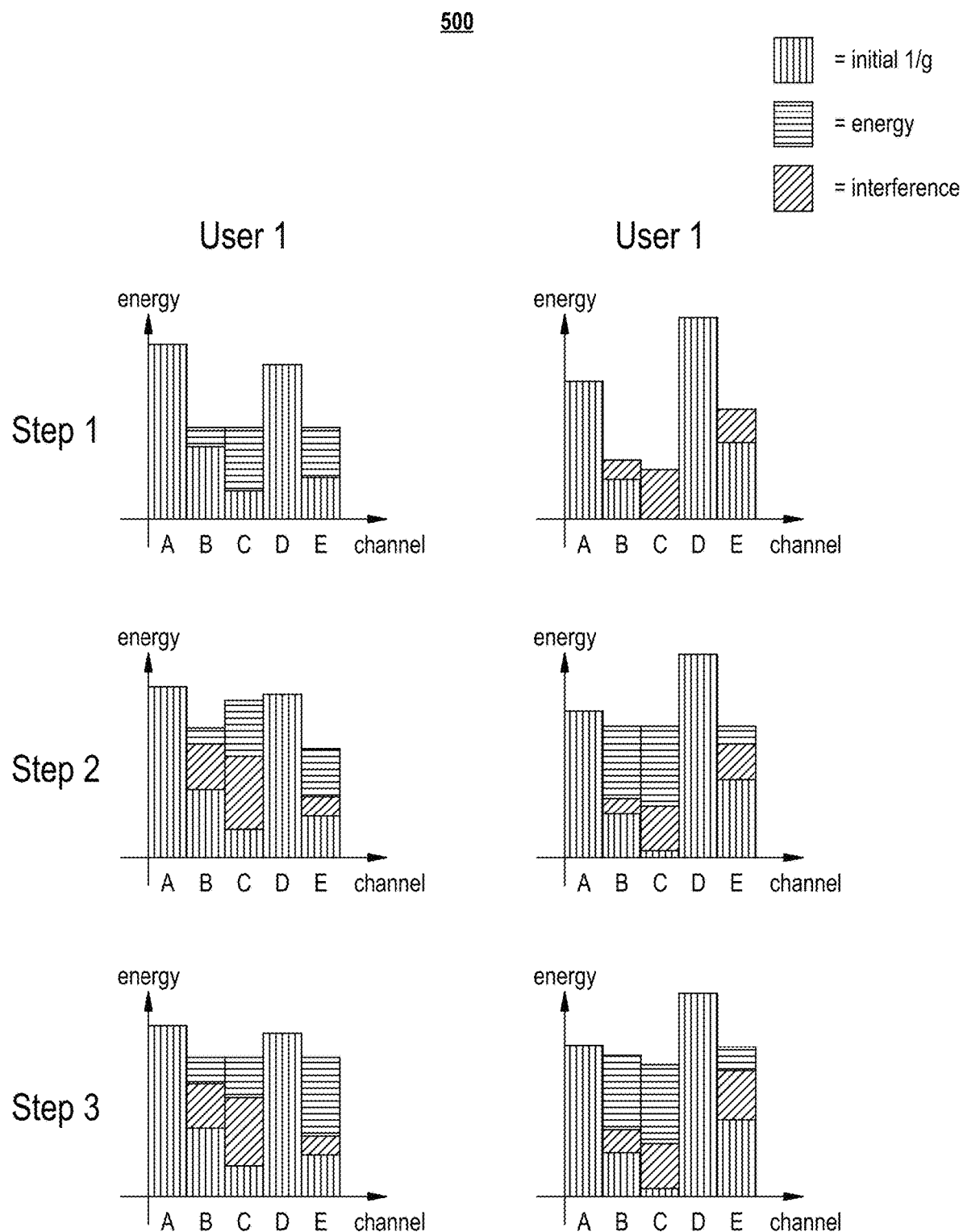
FIG. 5 illustrates iterative water-filling's functionality according to embodiments of the present disclosure.

FIG. 5 illustrates iterative water-filling's functionality according to embodiments of the present disclosure. Water-filling resource energization appears for five exemplary channels A, B, C, D, and E. User 1 initially water fills with User 2 not present. This creates the interference shown for User 2, who then attempts to water-fill. Progressing (downward in flowchart in FIG. 4), User 2 now water-fills on Channels B, C, and E, which creates interference to User 1. This manifests itself as lower g values particularly for Channel C, and thus a higher probability of low g values in Channel C's probability distribution. User 1 then proceeds to water-fill a second time knowing that Channel C is not good with high probability so less energy goes there. Correspondingly, this means less interference on Channel C into User 2, who then sees higher g values and loads more energy into Channel C.

Figure 6:
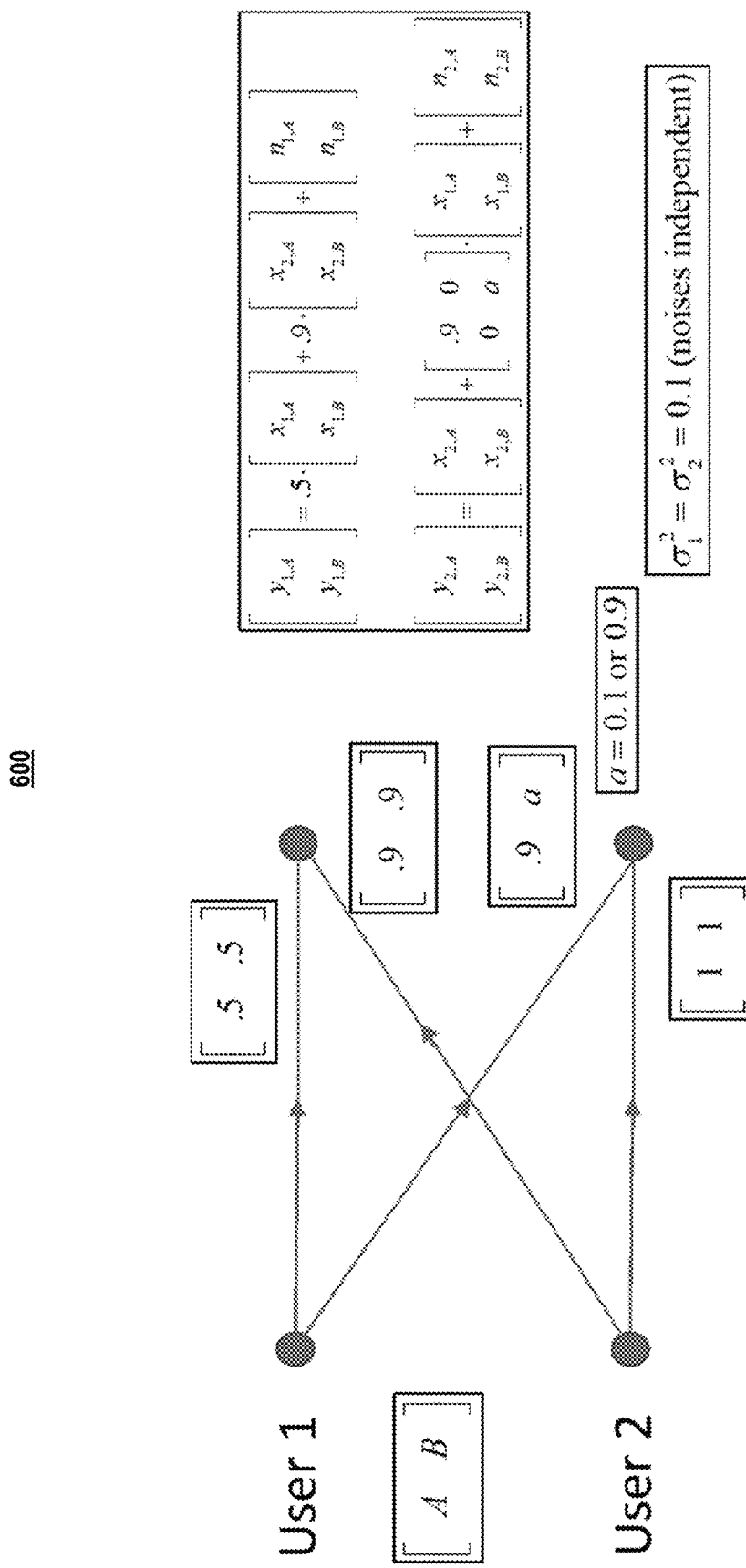
FIG. 6 illustrates an example of LRM's potential use and guidance to two radio node users with IW according to embodiments of the present disclosure.

The energy-minimizing dual water-filling form is particularly effective as long as the two data rates selected for the two users are feasible (each with a water-fill solution relative to the other). This is equivalent to a two-user game in which each user can perform no better by making additional changes, sometimes known as a Nash Equilibrium. The IW example in FIG. 6 illustrates the LRM's potential use and guidance to two radio node users with IW according to embodiments of the present disclosure.

3.1.1 Example—2-User IW Versus Contention Protocol

This example has two users who each can use both of two channels with different gains. User 1 has attenuation corresponding to a "far" or longer-length channel, and user 2 is a "near" or shorter-length channel. Both frequency bands A and B have the same gain on both channels (so they are likely close in terms of carrier frequencies). However, the interference between the channels is somewhat different. The parameter a is initially set at 0.1 and later revised to 0.9 to illustrate some effects. The noise is zero-mean white, uncorrelated between the two users, and has a variance of 0.1. Each user is allowed 2 units of energy to be allocated to channels A and B. Table 2 illustrates the iterative water-filling process for the case of a=0.1.

TABLE 2

Simple IW Example

| | Band A | Band B |
|---|---|---|
| User 1 | $\varepsilon_{1A} = 1$ | $\varepsilon_{1B} = 1$ |
| User 2 | $\frac{1}{g_{2A}} = .1 + (.9)^2 = .91$ | $\frac{1}{g_{2B}} = .1 + (.1)^2 = .11$ |
| | $\varepsilon_{2A} + .91 = \varepsilon_{2B} + .11$ | |
| | $\varepsilon_{2A} + \varepsilon_{2B} = 2$ | |
| | $\varepsilon_{2A} = .6 \quad \varepsilon_{2B} = 1.4$ | |
| User 1 | $\frac{1}{g_{1A}} = \frac{.1 + .6 \cdot (.9)^2}{(.5)^2} = 2.344$ | $\frac{1}{g_{1B}} = \frac{.1 + 1.4 \cdot (.9)^2}{(.5)^2} = 4.936$ |
| | $\varepsilon_{1A} + 2.344 = \varepsilon_{1B} + 4.936$ | |
| | $\varepsilon_{1A} + \varepsilon_{1B} = 2$ | |
| | $\varepsilon_{1A} = 2 \quad \varepsilon_{1B} = 0$ | |
| User 2 | $\frac{1}{g_{2A}} = .1 + 2 \cdot (.9)^2 = 1.72$ | $\frac{1}{g_{2B}} = .1 + 0 \cdot (.1)^2 = .1$ |
| | $\varepsilon_{2A} + 1.72 = \varepsilon_{2B} + .1$ | |
| | $\varepsilon_{2A} + \varepsilon_{2B} = 2$ | |
| | $\varepsilon_{2A} = .19 \quad \varepsilon_{2B} = 1.81$ | |
| User 1 | Remains $\varepsilon_{1A} = 2 \quad \varepsilon_{2B} = 0 \rightarrow$ IW has converged | |
| Data rates User 1 | $\log_2(1 + 2/2.344) = .89$ | 0 |
| Total User 1 | .89 bits | |
| Data rates User 2 | $\log_2(1 + .19/1.72) = .15$ | $\log_2(1 + 1.81/.1) = 4.26$ |
| Total User 2 | 4.4 | |
| Rate Sum | 5.3 bits | |

The data rates reflected in Table 2 are continuously flowing (streaming) for both users—there is no contention. This IW example illustrates that User 1 zeroes Channel B, a quasi-frequency-division-multiplexing like solution. However, User 2 uses both channels since it is the "near" channel, while the far channel (User 1) yields to the near channel on the band for which it performs worse (band B). For a symmetric channel with a=0.9, the second step would lead to a fully frequency-division-multiplexed (FDM) channel with User 1 using band A and User 2 using Channel B. Stage 1 ESM methods may often instead exploit a sufficient symmetry between channels when a larger inverse gain is evident and then move to an agreed channel split accordingly with each user occupying one channel. This may not be optimal, nor even good IW, but it may provide an acceptable solution, for example, when both users are heavily active.

As an alternative for the case of a=0.1, a contention protocol on this channel operating continuously for fair comparison might initially attempt to transmit User 1 for one-half the time and User 2 for the other half. This would have no interference. The corresponding contention-avoiding protocol's data rates are $b_{CA,1} = 0.5 \cdot 2 \cdot [\log_2(1 + 10 \cdot 0.5^2)] = 1.81$ $b_{CA,2} = 0.5 \cdot 2 \cdot \log_2(1 + 10 \cdot 1) = 3.46$ (Eq. 30)

and thus a sum of 5.25<5.3 (since water-filling considered this solution). However, for such always-on transmission, the effect of retransmission when contention might occur has been ignored if data were received randomly from the two users. Indeed, if both users desire access one-half the time, the contention protocol will fail and the data rate zeroes. However, the IW solution clearly handles this case. Thus, if IW were feasible, it would be much better than collision detection when channel use is heavy.

An alternative comparison could assume that User 1 and User 2 simultaneously transmit data only 10% of the time. In this case, Collision Detection (CD) functions properly with data rates of $$b_{CD,1} = 0.9 \cdot \log_2(1 + 10 \cdot 0.5^2) = 1.6$$

$$b_{CD,2} = 0.9 \cdot \log_2(1 + 10 \cdot 1) = 3.1 \quad \text{(Eq. 31)}$$

The rate sum, now considering the efficiency related to retransmission, is $$b_{CD,tot} = 1.6 + 3.1 = 4.7 \quad \text{(Eq. 32)}$$

The ergodic IW at 5.3 bits would in this case apply 10% of the time, while the remaining 90% time would transmit the nominal CD (or otherwise) sum of 5.2 bits. The LRM guidance to Users 1 and 2 would be to transmit the water-fill solution in Table 2A if the interference is non-zero, otherwise to use equal energy in both bands because there is no interference. The average remains roughly 5.3 bits (i.e., coincidentally the average data rates for interference and no interference are almost equal in this example, which need not be true in general), and the gain of IW (DSM) over collision detection is 13%. As use increases, the probability of collision increases, and the IW advantage would increase to be infinite at the point where the full throughput of both channels were used by IW. Again IW, while better, is not optimal and better solutions may be possible. Yet IW performs better than collision detection, as evident in this example.

For Stage 1 ESM water-filling, the LRM needed to know only the joint occurrence of certain sets of channel gains for the different users. This was tacit in assuming that the iterative water-filling procedure could be simulated in the LRM—thus that LRM process knew the channel gains to from the other users in the LRM. This means the LRM has previously observed situations where every other user's individual interference into a current user was viewed for a known transmit power level, and no other users were present. This would be evident from multi-user distributions estimated, as for instance described in Subsection 2.4.2.

3.2 Stage 2—Optimum Spectrum Balancing

For deterministic channels, the optimum multi-user spectra selection is well known (without any interference cancellation permitted) as Optimum Spectrum Balancing (OSB). The admissible range of all users' data rates are found by maximizing the convex weighted data-rate sum subject to an energy constraint on each user:

$$\max_{\{\varepsilon_{X,u}\}} \sum_{u=1}^{U} \phi_u \cdot \underbrace{\left[\sum_X \log_2(1 + \varepsilon_{X,u} \cdot g_{X,u})\right]}_{b_u} \quad \text{(Eq. 33)}$$

$$ST: 0 \leq \left[\sum_X \varepsilon_{X,u}\right] \leq \varepsilon_X \cap 0 \leq \theta_u \forall u = 1, \ldots, U$$

OSB therefore outer bounds the data rate combinations that IW can achieve. IW can, at best, match OSB. Margin adaptive IW may pick a rate vector for all the users $b = [b_1 \ldots b_U]$ and attempt to achieve this rate tuple by minimizing energy for each user. However, such a point may also not be a best operational point for a given amount of maximum energy for each user. OSB's vector of data-rate weightings $\phi = [\phi_1 \ldots \phi_U]$ may adjust the influence of different users. (Stage 1 IW essentially arbitrarily assigns these weights.) The achievable outer-bound of rate tuples corresponds to tracing the region for all possible non-negative weightings $\phi \geq 0$.

OSB's solution forms, defining $L_{X,u} = \omega_u \cdot \varepsilon_{X,u} - \phi_u \cdot b_u$ and $$\mathcal{L}_u = \sum_X \mathcal{L}_{X,u},$$

and the Lagrangian $$\mathcal{L} = \sum_{u=1}^{U} [L_u - \omega_u \cdot \varepsilon_u] \quad \text{(Eq. 34)}$$

The energy-constraint Lagrangian vector $\underline{\omega} = [\omega_1 \ldots \omega_U]$ may also be viewed in the above-mentioned MA dual problem that fixes a rate vector b and minimizes a weighted sum of energies using these non-negative weights. The OSB algorithm discretizes the energy range with some $\Delta\varepsilon$ into $$M = \max_u \frac{\varepsilon_u}{\Delta\varepsilon}$$

energy values and recognizes the separability over the channels to maximize individually each of the $\mathcal{L}_{X,u}$ terms over the $|X| \cdot U \cdot M^{|X| \cdot U}$ possible energy values for any given vectors $\underline{\omega}$ and $\underline{\phi}$. It is noted that the factor $|X| \cdot U$ corresponds to summing U interference components for each gain calculation in each of the $|X|$ bands, while the $M^{|X| \cdot U}$ factor corresponds to all the possible discrete energy combinations that could create $g_{u,X}$ values in computing $b_u$. The calculation of the possible interference transfers indeed requires $U \times U$ tensor generalization (each matrix element is viewed as a function with $|X|$ input/output mappings) of the channel gain from vector $g = [g_{1,X} \ldots g_{U,X}]$ to a matrix G. Calculation of the OSB solution is known to be complex, NP-Hard. The maximum in Eq. 33 and Eq. 34 then sums the terms in L when the best vectors have been found. An OSB implementation (slow converging but simple to describe) is the gradient descent iteration (for the RA problem of maximum weighted rate sum for given $\underline{\theta}$), with $\varepsilon = [\varepsilon_1 \ldots \varepsilon_U]$ and $\underline{\varepsilon}_X = [\varepsilon_{1,X} \ldots \varepsilon_{U,X}]$ so each energy is a scalar function of the frequency bands indexed as X, as $$\Delta\varepsilon = \varepsilon - \sum_X \varepsilon_X \quad \text{(Eq. 35)}$$

$$\omega \leftarrow \omega + \alpha \cdot \Delta\varepsilon$$

where $\alpha$ is a positive "step-size" constant.

Similarly, for the MA problem and fixed energy-weight vector $\underline{\omega}$ and known admissible/feasible target rate vector b:

$$\Delta b = b - \sum_X b_X \quad \text{(Eq. 36)}$$

$$\underline{\phi} \leftarrow \underline{\phi} + \gamma \cdot \Delta b$$

where $\gamma$ is another positive "step-size" constant.

Such a solution involves great complexity and also requires each radio node to know the channel gains of other radio nodes (physically impossible if required on instantaneous basis). Therefore, in embodiments, Stage 2 ESM is considerably simplified, using some limits on the search that allow local guidance to be a function of local instantaneous values, as a revisit of the example now shows.

3.2.1 Example Revisited

Revisit of the previous example readily determines that a solution of $\varepsilon_{1A}=2$ and $\varepsilon_{1B}=0$ with instead $\varepsilon_{2A}=0$ and $\varepsilon_{2B}=2$ yields data rates $b_1=2.6$ and $b_2=4.4$ (or a sum of 7 bits). A careful check of User 2's least significant bits would reveal that User 2 has a slightly higher data rate in the first instance of this example. User 1 of course performs much better with this FDM solution that would also be produced trivially by OSB for some appropriate choice of weight vector $\underline{\theta}$. Indeed, OSB is a function of this vector. OSB does not always produce an FDM solution, because it depends on the weight vector. The sum data rate is higher, and User 2 has essentially the same data rate while User 1 is much improved. The rate sum is 32% higher, while User 1 is 292% better. The guidance in this situation would be as simple as "User 1, use Channel A," and "User 2, use Channel B."

3.2.2 Orthogonal Dimension Division (ODD) Constraints

OSB solutions often exhibit a strong ODD aspect (FDM is a simple form, but the channels may also be in space) that often has each user using a mutually exclusive set of channels from the other channels, particularly for some choice of the user weights.

ESM Stage 2, in practice, would have the LRM search all possible ODD solutions. If the number of channels is $|X|$, then each user could have $2^{|X|}$ possible band choices. For U users, this then becomes $2^{|X| \cdot U}$ searches if equal energy were assigned to each channel. If there were M energy choices for each channel, then this becomes $M^{|X| \cdot U}$, so the order of computation is the same as for OSB. However, the guidance for the ODD solutions may follow the same format as ESM Stage 1 with one exception: certain different sets of active users could produce the same channel gain for the same victim user. The LRM should consider this in its calculations and may provide the worst-case ODD (FDM) solution for such situations.

Various simplifications, such as ISB and SCALE convex bounding, may approximate basic OSB with faster algorithms, as can Multi-Level Iterative Water-filling solutions. These would have similar modifications for the restriction to search only ODD solutions. They would also correspond to Stage 2 ESM. It is possible that Stage 1 would outperform Stage 2 simply because Stage 1 is less restrictive in terms of only specifying functional guidance to each radio node rather than ergodically imposed ODD constraints. However, the LRM would know this and simply provide the Stage 1-type guidance. Indeed, the radio node in this case would not know whether it was being operated by a Stage 1 or Stage 2 LRM.

Stage 2 ESM is particularly pertinent for "mesh networks" that have sub radio nodes within a node. In such systems, the sub nodes act as relays and thus correspond to 2 users (one receiving and one retransmitting) on different channels. An LRM operating for a single radio node with sub nodes would find the optimum OOD solution among all the FDM solutions for the mesh. It is feasible to consider also solutions where Stage 1 is used between radio nodes and Stage 2 is used within the node's mesh.

The following subsection introduces an ODD-specific algorithm that greatly simplifies the search and may be viewed as a discrete form of a "multi-level water-fill" algorithm.

3.2.3 Example of 4-Band 2-User Complexity

Another example illustrates the rapid growth of complexity. Returning to FIG. 2, two users may divide 4 channels between them. For this example, $b_1=b_2=4$. If integer bits are allowed, this means the number of energy levels on any channel cannot exceed M=5, i.e., zero plus the energy to transport 1, 2, 3, or 4 bits on that channel. The maximum number of possibilities to search in this case cannot exceed 5 levels for each of the 4 channels for 2 users or $(5 \cdot 5 \cdot 5 \cdot 5^2)$ $=5^8=390625$ possible OSB spectrum choices to search. However, this maximum number can be reduced: since each user's bits must add to 4, it is possible to see that if one user uses only 1 channel for all 4 bits, there are 4 choices for that user (use one of the channels). If that user instead places 3 bits on one channel, then that same user must place one bit on one of the other 3 channels leading to 12 more choices. Similarly, if that user places 2 bits on one channel, there are 6 distinct choices for the case of 2 bits on another channel. Also for the user with 2 bits on one channel, there are an additional 3 ways to place 1 bit each on each of the two remaining channels, so a sub-total of 12. 4+6+12+12=34. The last combination of 1 bit on all 4 channels leads to 35. The total number of combinations is then 35·35=1225 for two users that each have 4 bits.

With the ODD restriction, further complexity reduction occurs, the overall complexity may be reduced to 150 choices: If each user uses 2 channels, the computational complexity is $$\binom{4}{2} \cdot 5 = 30$$

(5 arises from the possible bit distribution in two channels is 40, 31, 22, 13, 04). If User 1 uses 1 channel and thus User 2 can use up to 3 channels, there are 4*15=60 choices where 4 is the possible channel selection of User 1 and 15 is the possible bit distribution for User 2 (400, 310, 301, 220, 211, 202, 130, 121, 112, 103, 040, 031, 022, 013, and 004). The reversal of User 1 to 3 channels and User 2 to one channel is another 60 choices due to symmetry. The [1111] combination for one user is not possible, because the other use then cannot get 4 bits (or any) bandwidth. Therefore, the total complexity reduction is from 35*35=1225 down to 150 choices.

However, as the number of bits (and therefore energy level possibilities) increase for instance to the 6 possible SQ QAM choices of LTE and Wi-Fi, the number rapidly rises (for 4 channels) to nearly $2^{50}$ choices.

3.2.4 an Implementable Stage 2 ODD ESM Algorithm

In embodiments, a Stage 2-compatible radio node may provide an indication of its volume of use for an observation interval to the LRM. This indication may be indexed by time of day, peak periods, off-peak periods, etc. The LRM may compute the volume for each user for a given normative time/observation period for all users. That volume is herein denoted as V. In embodiments, the LRM orders the channel gains for each user across the channels X from largest to smallest. The users are ordered from largest to smallest V.

In embodiments, a simplified exemplary ODD algorithm may comprise the following steps:

| | |
|---|---|
| Step 1 | The LRM chooses the largest channel $X = \arg\{\max_X(g_{u,X})\}$ for the user with largest $V_u$ and assigns $X$ to user $u$. |
| Step 2 | All users $i \ne u$ for which $p_{g_i,g_u} \ne 0$ delete X from their set of available channels. |
| Step 3 | The volume is reduced for User u by an amount corresponding to the use of channel X. |
| Step 4 | Update orderings, and repeat Steps 1-3, until all channels have been used. |

This algorithm is somewhat greedy in that it serves the users with greatest volume of need, but those needs may increase if a user receiving little channel assignment therefore begins to see greater average volume need. The algorithm's complexity basically is U·|X|, i.e., on the order of the Stage 1 IW approach. The algorithm essentially creates a water-fill problem with different water levels for the different channels used by any particular user.

3.2.5 Ergodic OSB

In embodiments, an ergodic form of OSB may be employed. Ergodic OSB guarantees optimality (in the absence of any Stage 3-like interference cancellation) only with infinite buffer-scheduling delay and truly ergodic statistics. In embodiments, an ergodic OSB may use the joint probability distribution $p_{g,X}$ for the random vector of channel gains in each band X and become $$\max_{\{\varepsilon_{X,u}\}} \sum_{u=1}^{U} \phi_u \cdot \underbrace{\left[ \sum_{g_{u,X} \in \mathcal{G}_{u,X}} p_{g_{u,X}} \cdot \log_2(1 + \varepsilon_{u,X} \cdot g_{u,X}) \right]}_{\langle b_u \rangle} \quad \text{(Eq. 37)}$$

$$\text{ST: } 0 \le \left[ \sum_{g_{u,X} \in \mathcal{G}_{u,X}} p_{g_{u,X}} \cdot \varepsilon_{u,X} \right] \le \varepsilon_X \cap 0 \le \phi_u \forall u = 1, \ldots, U$$

where averages over the joint probability distribution's marginal distributions for each of the users $p_{g_{u,X}}$ are (found by summing over all the other users possibly gain values):

$$p_{g_u,X} = \sum_{g_{i \ne u,X}} p_{g,X} \quad \text{(Eq. 38)}$$

presumably precalculated and stored, involving $\|\mathcal{G}\|^U$ calculations. The Lagrangian terms adjust to $\mathcal{L}_{g_{u,x}} = \omega_u \cdot p_{g_u,x} \cdot \varepsilon_{u,X} - \phi_u \cdot p_{g_{u,X}} \cdot \log_2(1 + \varepsilon_{u,X} \cdot g_{u,X})$ with $$\mathcal{L}_u = \sum_{g_{u,X} \in \mathcal{G}_{u,X}} \mathcal{L}_{g_{u,X}}$$

and then Eq. 34 remains the same. The energy range is similarly partitioned into M discrete levels and the complexity then becomes $|\mathcal{G}| \cdot M$ calculations for each term and then adding $|\mathcal{G}|$ of these maxima together for each index in $\mathcal{L}_u$, so then $|\mathcal{G}|^2$ ($|\mathcal{G}|$ being the maximum number of gain segments for any user over all bands X). EIW's complexity might appear less than IW, but the large calculation burden shifts to the large computation amount $|\mathcal{G}|^U$ for the probability distribution in Eq. 38. The gradient search steps adjust to $$\Delta \underline{\varepsilon} = \underline{\varepsilon} - \sum_{g \in \{\mathcal{G}_{1,X} \otimes \ldots \otimes \mathcal{G}_{U,X}\}} p_{g,X} \cdot \underline{\varepsilon}_X \quad \text{(Eq. 39)}$$

$$\underline{\omega} \leftarrow \underline{\omega} + \alpha \cdot \Delta \underline{\varepsilon}$$

or for the MA case □

$$\Delta b = b - \sum_{g \in \{\mathcal{G}_{1,X} \otimes \ldots \otimes \mathcal{G}_{U,X}\}} p_{g,X} \cdot b_X \quad \text{(Eq. 40)}$$

$$\underline{\phi} \leftarrow \underline{\phi} + \gamma \cdot \Delta b$$

More sophisticated search/descent methods than the slowly converging gradient may be used.

3.3 Stage 3—Vectored ESM

Stage 3 vectored ESM allows spatial interference cancellation through some additional coordination of multiple radio nodes' multiple-antenna systems. Stage 3 ESM essentially configures multiple antennas to provide signal separation without performing real-time signal cancellation. Each ESM Stage 3 radio node has multiple antennas for at least downlink transmit and uplink reception. The devices in each radio node's cell (same "color" as the radio node, i.e., the same band) may have one or more antennas. The Stage 3 ESM radio node has more antennas than current devices in practice, and ideally the number of such radio-node antennas significantly exceeds the total number of users L>>U. ESM's Stage 3 depends therefore on massive MIMO's presence in the radio node. This subsection focuses on a radio node with L antennas, and devices with 1 or more antennas each. However, the calculations are for the single antenna per device/user case. Extension to more device antennas is notationally tedious but will be straightforward to a person of skill in the art.

Within any node, multi-user MIMO (MU-MIMO) methods may make use of diagonal dominance that will also occur for large L in wireless applications. These benefit from the nodes' learned knowledge and coordinated management of all downlink transmissions or alternately from learned co-processing at a single point all the uplink signals. These methods make use of Generalized Decision Feedback Equalizers or their dual generalized-precoder forms, and have essentially optimum multi-user performance on vector broadcast and vector multiple-access channels. Again, they all require centralized control at the radio node.

ESM Stage 3 assumes that precoded interference cancellation of other radio nodes' signals is not possible (because, unlike the MU-MIMO/vectored case, those signals are not physically available). ESM is different than LTE's Coordinated Multipoint Transmission (CoMP), which operates with a smaller level of antennas and coordinates physically separated radio nodes at instantaneous transmit signal level.

Similarly, no individually controlled post-coded subtraction of another radio-nodes' user interference is (generally) possible for a receiver because it may not have access to, nor be able to decode (itself), that radio-nodes' user signals. However, if a radio node has enough "extra" antennas, it is possible spatially to exploit linearly these extra dimensions, such that the radio nodes jointly steer downlink to each other's "null space" (or null/notch uplink). Sufficient extra antennas usually means that the number of antennas exceeds the total number of users. The greater the excess, the more flexible are the possibilities for steering and acquiring without explicit (unlike MU-MIMO) need for other radio-nodes' user signals. It has been shown that usually 2× to 3× the number of users is sufficient for the number of antennas to be considered large.

ESM Stage 3 again presumes radio nodes' symbol synchronization. This may be achieved by radio nodes' use of a common inferred clock through several methodologies beyond the scope of the present disclosure, but Section 5 provides some suggestions. Better synchronization implies greater spatial accuracy.

3.3.1 Vector Channel Models

To understand ESM vectoring, a deterministic channel model is first summarized. For the deterministic model, a prescient controller might theoretically have access to the large channel-gain matrix H in FIG. 7 and non-user noise autocorrelation matrix $R_{nn}$, such that a vector of all channel outputs' responses y to all users' inputs x follows the vector model $$y = Hx + n \quad \text{(Eq. 41)}$$

The gains matrix G would be $G = H^* \cdot R_{nn}^{-1} \cdot H$ and would have within it all interfering paths specified in terms of each channel's gains to all others. Eq. 41 with these constraints is known as the vector interference channel.

The entire downlink multi-user channel has U outputs (1 antenna at each device or output) and each input radio node has L>>U antennas and, therefore, a total of LU antennas. The model is:

$$\underbrace{\begin{bmatrix} y_{down,U} \\ \vdots \\ y_{down,1} \end{bmatrix}}_{U \times 1}^{y_{down}} = \underbrace{[H_{down,U} \cdots H_{down,1}]}_{U \times LU}^{H_{down}} \cdot \underbrace{\begin{bmatrix} x_{down,U} \\ \vdots \\ x_{down,1} \end{bmatrix}}_{LU \times 1}^{x_{down}} + \underbrace{\begin{bmatrix} n_{down,U} \\ \vdots \\ n_{down,1} \end{bmatrix}}_{U \times 1}^{n_{down}} \quad \text{(Eq. 42)}$$

Transmission from user input u corresponds to the model component that is the contribution from the 1×L input $x_{down,u}$ and user u's corresponding output component may be written as:

$$\underbrace{y_{down,u}}_{1 \times 1} = \underbrace{H_{down,u}}_{1 \times L} \cdot \underbrace{x_{down,u}}_{L \times 1} + \underbrace{n_{down,u}}_{1 \times 1} \quad \text{(Eq. 43)}$$

The input to this channel, $x_{down,u}$, when L>>U can beamform zero energy to each of the other user's i≠u single antenna locations (directions).

Correspondingly, the uplink channel may be similarly modeled with a single scalar transmit antenna at each user location, all transmitting to U separate radio nodes:

$$\underbrace{\begin{bmatrix} y_{up,U} \\ \vdots \\ y_{up,1} \end{bmatrix}}_{LU \times 1}^{y_{up}} = \underbrace{[H_{up,U} \cdots H_{up,1}]}_{LU \times U}^{H_{up}} \cdot \underbrace{\begin{bmatrix} x_{up,U} \\ \vdots \\ x_{up,1} \end{bmatrix}}_{U \times 1}^{x_{up}} + \underbrace{\begin{bmatrix} n_{up,U} \\ \vdots \\ n_{up,1} \end{bmatrix}}_{LU \times 1}^{n_{up}} \quad \text{(Eq. 44)}$$

In the uplink case, each radio node u has an uplink L×1 received vector that is $$\underbrace{y_{up,u}}_{L \times 1} = \underbrace{J_u}_{L \times LU} \cdot \underbrace{H_{up}}_{LU \times U}^{H_{up}(u)} \cdot \underbrace{x_{up}}_{U \times 1} + \underbrace{n_{up,u}}_{L \times 1} \quad \text{(Eq. 45)}$$

where $J_u$ is a puncturing matrix with an identity in the positions to pass only user u's output dimensions and zeros elsewhere, so it passes the appropriate L rows of $H_{up}$. In the uplink direction, each of the U−1 columns (i≠u) of the L×U channel row-subset matrix $H_{up,u}$ represents interference. When L>>U, a single 1×L "equalizer" (diversity combiner) may zero all the users' i≠u energy at the detection point of user u's detector, such that only user u is received.

In the situation where different radio nodes may use the same channels for uplink and downlink, effectively the number of users doubles (U→2U) in the models, and some of the individual users' input/output models have corresponding dimensionalities of anywhere between L×1 to L×L downlink and 1×L to L×L uplink.

3.3.2 Optimization of the Vector Interference Channel

When the number of downlink transmit antennas is large for many or all the radio nodes' transmitters, relative to the number of users L>>U, the tall matrix $H_{down,u}$ may be preprocessed (precoded) with a set of linear transmit matrices at each radio node's massive set of L antennas. This creates many degrees of freedom upon which spatial modes may transmit for each of the massive-antenna transmitters' radio nodes. These spatial modes may be energized or zeroed such that only the desired receiver captures energy from the intended user. Energy transmitted in the spatial direction of the un-intended users is zeroed. Apart from singular cases where two users are exactly on the same line that passes also through all transmit antenna locations, enough antennas may achieve the spatial separation. Dually uplink, a large number of receive antennas may capture energy from only the intended user while notching all other users' directions. These effects are sometimes called "channel hardening."

Figure 7:
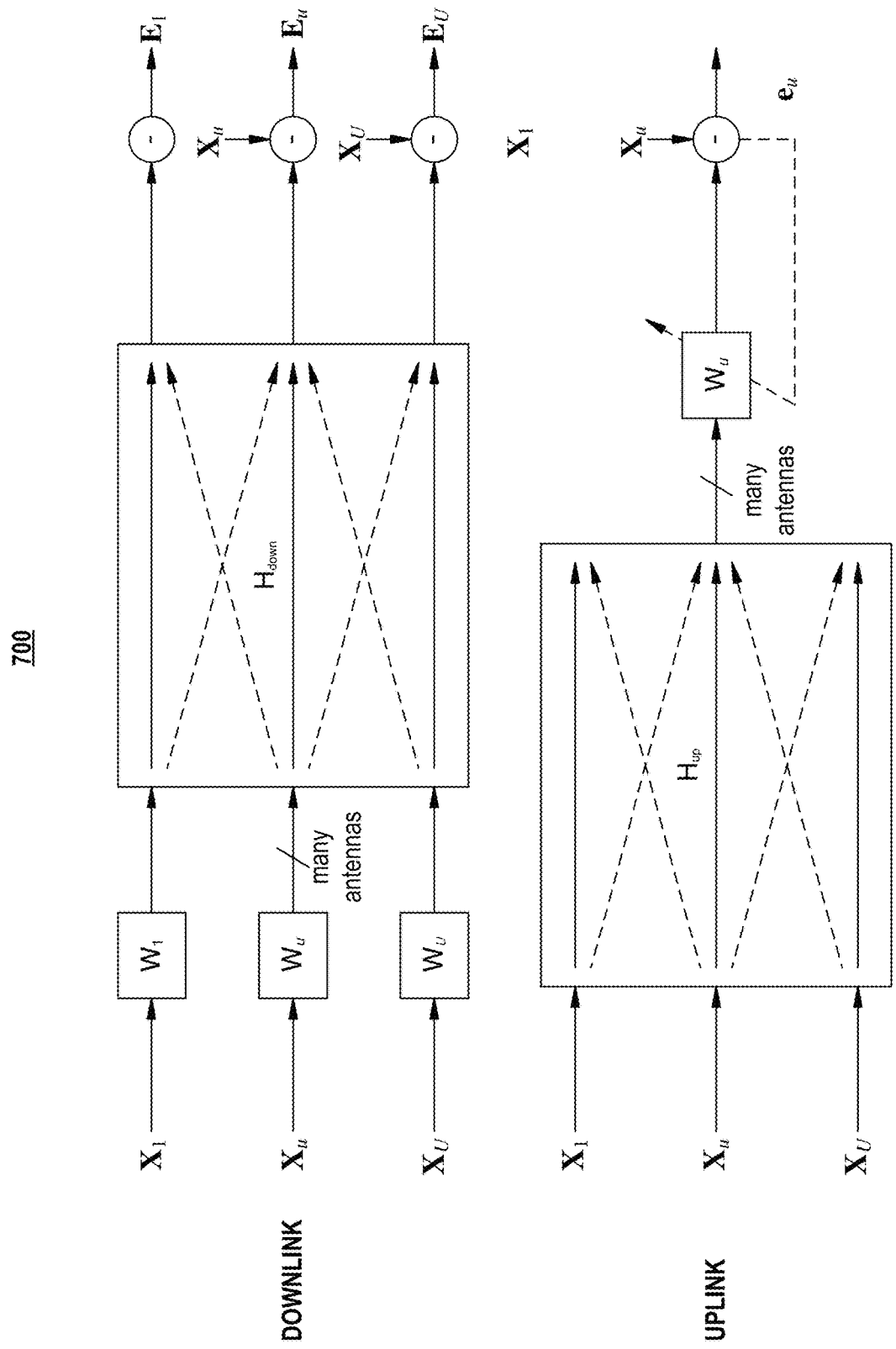
FIG. 7 illustrates and exemplary adaptive processors according to embodiments of the present disclosure.

FIG. 7 illustrates and exemplary adaptive processors for user u according to embodiments of the present disclosure. Depicted is a transmit orthogonal matrix tuner that zeros energy output at all locations except the intended location. For the deterministic case with FIG. 7's instantaneous adaption of the transmit precoder'S $W_{down,u}$ (downlink) or the receive postcoder's $W_u$ (uplink), it is possible to largely eliminate interference if the number of antennas at any one transmit (downlink) or one receive (uplink) location L significantly exceeds the number of users, L>>U. In these cases, a linear solution is (asymptotically) optimal and may be found for each user using the corresponding pinning vector $\sigma_u$ that is all zeros, except for one "1" in the $u^{th}$ position. If the corresponding U×L downstream matrix is given by $H_{down,u}(u)$, the optimal set of synchronized linear precoders (each operating on its own input) is given as an L×1 vector by $$W_{down,u} = \underbrace{H^+_{down,u}}_{L \times U} \cdot \underbrace{\sigma_u}_{U \times 1} = \alpha_{w,u} \cdot \underbrace{H^*_{down,u}}_{L \times U} \left[ \underbrace{H_{down,u} \cdot H^*_{down,u} + I}_{U \times U} \right]^{-1} \cdot \sigma_u \text{(downlink)}$$
(Eq. 46)

where $\alpha_u$ is a scalar that ensures the transmit energy is not increased. A superscript of "+" denotes pseudoinverse when the I term is ignored. (The added identity is usually ignored in zero-forcing approaches (without much loss) in Eq. 46.) A superscript of "*" denotes conjugate transpose. The corresponding uplink receiver postcoder is 1×L and equal to $$W_{up,u} = \underbrace{\sigma^*_u}_{1 \times U} \cdot \underbrace{H^+_{up}(u)}_{U \times L} = \sigma^*_u \cdot \left( \underbrace{H^*_{up}(u) \cdot H_{up}(u) + I}_{U \times U} \right)^{-1} \underbrace{H^*_{up}(u)}_{U \times L}$$
(Eq. 47)

The downstream $H_{down}$ and upstream $H_{up}$ matrices need not be the same upstream and downstream. This system enables space-division multiplexing where the same time/frequency dimensions may be shared by all users because the large number of transmit (downstream) antennas or receive (upstream) antennas essentially beamforms a notch in the direction of the other users, thus, allowing the common channels' spatial reuse. However, the requirements on control are severe in that no one device or radio node has access to all the signals, such that their channels' [$H_{down}$ $H_{up}$] would need to be known at a central (LRM) location. In the vector interference channel, none of the users requires inputs from the other channels (which are processed in different locations, but need to know the channel matrices). This Vector ESM solution is akin to each radio node viewing all other systems as within its own cell and adapting antennas/space accordingly as in a MU-MIMO system; however, each has the benefit of being close to its own radio node on the one non-zero path that links the relevant user. Such a system ideally allows frequency/time dimensional reuse across space and uses training protocols to are synchronized on a time/frequency grid that spatial reuse was agreed on between the users. Essentially, this is the reason for using the common symbol clock in Stage 3 ESM.

3.3.3 Updating the Precoders and Postcoders

Stage 3 ESM recognizes that each L×L precoder/equalizer may be first locally computed through a QR factorization of an identified channel matrix. For downlink, this channel matrix is essentially recursively constructed one user's row $h_u$ at a time (complex measured gains from the radio node antennas to the single user antenna)

$$H_{down,u} = \begin{bmatrix} h_{down,u} \\ H_{u-1} \end{bmatrix}$$
(Eq. 48)

to the radio node during initialization, corresponding to each user's identification of training signals sent to it. That initialization returns this information for devices associated with that same radio node. However, the LRM may collect (e.g., more slowly) these channel row vectors for every user (with respect to every radio node's L antennas). This identification would be associated with a radio-node color (different from the radio-node color associated with each device's primary environment). Each node may then accept such effectively "user-direction" vectors (from the LRM) as input to the QR factorization (which becomes larger, but still computable since U<L) of Eq. 48. As long as the user's position relative to the radio node remains the same, the Stage-3-capable radio node may simply accept (up to) U−1 such vectors to add to its QR factorization to determine the transmit precoder matrix. Each row may be written as $$h_{down,u} = \begin{bmatrix} \underbrace{\tilde{h}_{down,u}}_{L-u-1} & \underbrace{\hat{h}_{down,u}}_{u-1} \end{bmatrix}$$
(Eq. 49)

Where the separation point u increases (moves to the left) with the number of users. The users may be reordered at any radio node such that the user of interest is at the bottom, thus, $\sigma_u \to \sigma = [0 \ldots 0 \ 1]$. Thus, user 1 is the one for which the transmit energy is desired to be non-zero at the single-antenna receiver in its own radio-node (or color). The user indices u≥2 then refer to other users in whose direction zero-energy transmission is desired. When u=1, the situation is single user and $h_u = \tilde{h}_u$. The QR factorization of then u×L $H_{down,u}$ may be written $$H_{down,u} = \begin{bmatrix} \underbrace{0}_{L-u} & \underbrace{R_{down,u}}_{u \times u} \end{bmatrix} \cdot \underbrace{Q^*_{down,u}}_{L \times L}$$
(Eq. 50)

where $Q_{down,u}$ is unitary ($QQ^* = Q^*Q = I$) and is not unique when L>U, Further, when L>>U≥u, the square upper-triangular matrix $R_{down,u}$ will be diagonally dominant, so the off-diagonal terms are small relative to the diagonal elements in the corresponding row. By combining Eq. 49 and Eq. 50, $$H_{down,u} = \begin{bmatrix} 0 & \|\tilde{h}_{down,u}\| & \hat{h}_{down,u} \\ 0 & 0 & R_{down,u-1} \end{bmatrix} \cdot Q^*_{down,u-1} \cdot \begin{bmatrix} \tilde{Q}^*_{down,u} & 0 \\ 0 & I \end{bmatrix}$$
(Eq. 51)

Where $\tilde{Q}_{down,u}$ is an L−u+1×L−u+1 orthogonal matrix that may be implemented by a series of L−u Givens rotations (or a single Householder Transformation) that rotates all $\|\tilde{h}_{down,u}\|$'s energy into the right-most component. The diagonal dominance is heuristically evident when L>>U because any u≤U components of the vector will be much less than the nearly full energy of all L−u components. Solving Eq. 46 with Eq. 51 yields the solution $$W_{down,u} = Q_{down,u} \begin{bmatrix} 0 \\ R^{-1}_{down,u} \end{bmatrix} \cdot \sigma \approx \begin{bmatrix} \tilde{Q}_{down,u} & 0 \\ 0 & I \end{bmatrix} Q_{down,u-1} \cdot \frac{\sigma}{\|\tilde{h}_{down,1}\|}$$
(Eq. 52)

which amounts to rotating the last column of the solution for u−1 users by the Givens rotations for the new user u. The diagonal/triangular matrix becomes $R_{down,u} = \text{diag}\{\|\tilde{h}_{down,u}\| \ldots \|\tilde{h}_{down,2}\| \ \|\tilde{h}_{down,1}\|\}$. The uplink process is the same, simply with commuting of matrices (and again L>>U diagonal (column) dominance) to get $$W_{up,u} = \frac{\sigma^*}{\|\tilde{h}_{up,1}\|} \cdot Q^*_{up,u-1} \cdot \begin{bmatrix} \tilde{Q}^*_{up,u} & 0 \\ 0 & I \end{bmatrix}$$
(Eq. 53)

For uplink, the radio node may directly identify the channel from devices within its cell (e.g., same SSID in Wi-Fi). The LRM may indicate when other-color radio nodes are excited, and thus, for the additional uplink columns for each other-color active uplink user, an additional column may be added to $H_u$ prior to the QR factorization that determines $W_u$. If the device(s) relative to the radio nodes are stationary, then these additional columns should be constant.

The users' rows may be ranked in terms of importance to add to the overall channel matrix in terms of the values of $\|h_u\|_2$ since this interference otherwise would be the largest noise contribution.

3.3.4 Example of Vectored ESM

Two radio nodes operate downlink, each with L=5 transmit antennas. Each radio node attempts communication in the same frequency band to a single user with 1 antenna. There is interference from other radio node's single user. A simple model to illustrate the effects is $$\begin{bmatrix} y_2 \\ y_1 \end{bmatrix} = \begin{bmatrix} \underbrace{1 & 1 & 1 & 1 & 1}_{H_{down,2}} & \underbrace{.9 & .9 & -.9 & -.9 & -.9}_{H_{down,1}} \\ \underbrace{-.5 & -.5 & .5 & .5 & .5}_{H_{down,2}} & \underbrace{1 & 1 & 1 & 1 & 1}_{H_{down,1}} \end{bmatrix} \cdot \begin{bmatrix} x_{25} \\ x_{24} \\ x_{23} \\ x_{22} \\ x_{21} \\ x_{15} \\ x_{14} \\ x_{13} \\ x_{12} \\ x_{11} \end{bmatrix} + \begin{bmatrix} n_2 \\ n_1 \end{bmatrix}$$ (Eq. 54)

In Eq. 54, each of the two inputs may have total power 1 (across all antennas) and the noises may be independent, Gaussian, and of variance 0.01. Such a channel is oversimplified, but creates a situation where User 1 interferes with User 2 at 6 dB below signal level (the negative signs indicate some phase differences without overly complicating the mathematics that here are intended to illustrate basic concept). User 1 experiences more heavy interference (e.g., only 1 dB reduced) from User 2, possibly indicative of a mild "near-far" channel. User 2 is physically separated from User 1 on the device side. Radio node 2 does not have access to User 1's inputs, and vice-versa. Nonetheless, the channel matrix may be written as in Eq. 54. The linear downlink precoder at Radio Node 2 is a 5×1 matrix that may be computed from Eq. 46 as $$W_{down2} =$$ (Eq. 55)

$$H^*_{down2} \cdot (H_{down,2} \cdot H^*_{down,2})^{-1} \cdot \begin{bmatrix} 1 \\ 0 \end{bmatrix} = \begin{bmatrix} \frac{1}{4} & -\frac{1}{2} \\ \frac{1}{4} & -\frac{1}{2} \\ \frac{1}{6} & \frac{1}{3} \\ \frac{1}{6} & \frac{1}{3} \\ \frac{1}{6} & \frac{1}{3} \end{bmatrix} \cdot \begin{bmatrix} 1 \\ 0 \end{bmatrix} = \begin{bmatrix} \frac{1}{4} \\ \frac{1}{4} \\ \frac{1}{6} \\ \frac{1}{6} \\ \frac{1}{6} \end{bmatrix}$$

The second column of the pseudoinverse is shown in Eq. 55 because it might be that the two users' roles were reversed (or even roam from one node to the other), but only User 2 is important at the device for user 2. This is readily checked by computing $$H_{down,2} \cdot W_{down,2} = \begin{bmatrix} 1 \\ 0 \end{bmatrix}$$ (Eq. 56)

This means that any energy from User 1 does not appear at receiver 2. Similarly, $$H_{down,1} \cdot W_{down,1} = \begin{bmatrix} 0 \\ 1 \end{bmatrix}$$ (Eq. 57)

Thus, the two users may share the same frequency/time dimensions. To ensure 1 unit of energy across the 5 antennas, it is useful to note that $\|W_{down,2}\|_2 = 0.2$ or ⅕, so that the input energy to the precoder is then 5 units to ensure that 1 unit of energy across all antennas is transmitted. These 5 units reach User 2's device interference-free. Apart from synchronization, Radio Node 2 knew nothing about the input of Radio Node 1 (and vice versa). This is vectored ESM in its simplest form. However, vectored ESM is not optimal. For small noise, the optimum receiver on this channel would rely on the factorization in Eq. 50, for which the R matrix may be found as $$R = \begin{bmatrix} 0 & 0 & 0 & 2 & 1 \\ 0 & 0 & 0 & 0 & \frac{1}{\sqrt[5]{5}} \end{bmatrix}$$ (Eq. 58)

The matrix is not quite diagonally dominant with 5 antennas, but the loss factor for a perfect dirty-paper precoder would be 4. The optimum precoder's overall Stage 3 ESM improvement is 5/4=1 dB. Thus, using linear instead of optimum nonlinear precoder loses 1 dB. If L→10 in this example (with interference coefficient remaining as amplitude 0.5), the loss is 0.46 dB, and with L=100, the loss is 0.04 dB. Thus, diagonal dominance is increasingly evident in ensuring that the linear solution is nearly optimal. A similar uplink example could be constructed. The overall gain here is at least 100%, because two users may share the bandwidth that previously only 1 could use (and collision detection would dramatically increase above 100% if both users are streaming, similar to the example in Subsection 3.1).

Figure 8:
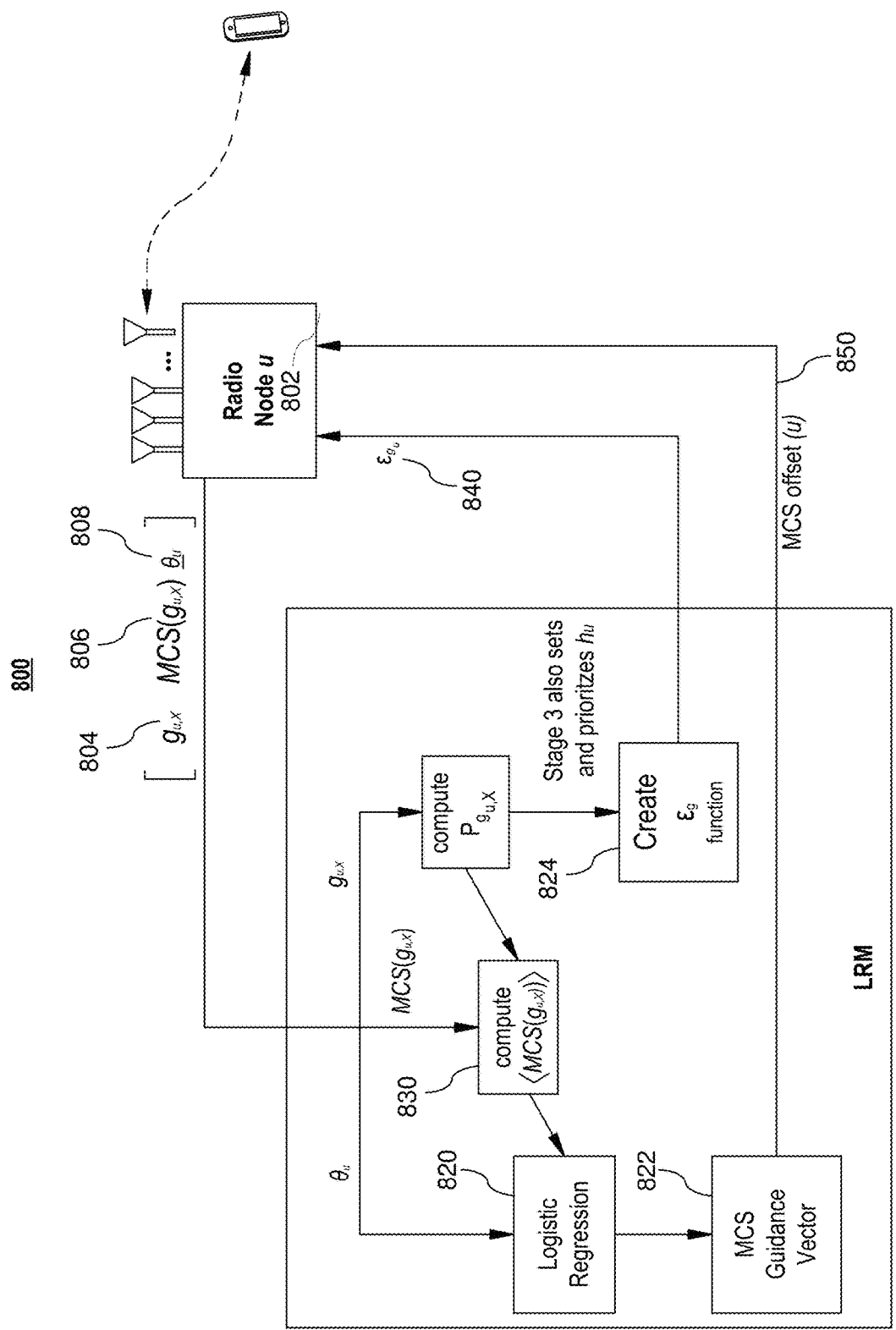
FIG. 8 illustrates an exemplary ESM process for a single user according to embodiments of the present disclosure.

4. MCS Criteria, Functional Specification, and Gains' Probability-Distribution Estimation This section addresses first the LRM's separation of QoE-based MCS selection and Section 3's spectral optimization. FIG. 8 illustrates an exemplary ESM process for a single user according to embodiments of the present disclosure. The overall ESM process 800 in FIG. 8 shows both parametric feedback to LRM 102 and functional guidance 822, 824 from LRM 102. Radio nodes (e.g., 802) provide recent channel-gain 804 and MCS values 806 to LRM 102 along with various recent-history QoS parameters $\theta_u$ 808. In embodiments, LRM 102 processes these values to produce QoE estimates, as described in Subsection 4.1, in parallel with calculation of the channel-gains' probability distributions $p_{g_u}$ (see Subsection 2.4). The latter, $p_{g_u}$, may be used as in Section 3 to compute the spectral functional guidance.

In embodiments, functional guidance may comprise energy function 840 that may be a function that defines energy given g. Functional guidance may also comprise an MCS function (e.g., MCS offset 850) that defines MCS given g. Functions may be communicated in any format, such as a table. In embodiments, a function need not be communicated to radio node 802 in full. The function may be updated incrementally or based on incremental information. Feedback may be provided at different times and in different amounts without a full description of the entire function, e.g., in a partial table or by any number of table entries.

In embodiments, the channel-gains' probability distributions, $p_{g_u}$, maps into an ergodic-average MCS 830, which in turn may be used by logistic regression processor 820, e.g., to determine if the radio node's MCS choices are consistent with the QoE of the user. In embodiments, other machine-learning algorithms, such as generalized linear model, gradient boosting method, or hidden Markov model may be used in lieu of logistic regression.

In embodiments, QoE data comprises data associated with measured indications of internet-user/thing happiness. Examples may comprise user complaint calls/messages to a service/help desk, user requests for chat-box help, repair, dispatch to the user's location, discontinuation (dropping/quitting) of service, customer survey responses, mean-opinion scores, use of like/unlike buttons, and the like. This information can be delivered from radio node to LRM in an embodiment. In other embodiment, the information can be delivered from other sub-system of operator's management system, for example, call log from call-center system.

In embodiments, QoS data comprises performance metrics, such as packet error rates, data rate variations, outage probabilities, etc. Subsection 4.1 introduces logistic regression methods to estimate QoE from QoS based on earlier historical training on QoE data indications, presuming a level of ergodicity in this relationship. Because of the closed feedback system, ESM may effectively jointly optimize the spectra and the MCS although both are largely independent, thereby, simplifying one of traditional RRM's major challenges. Subsection 4.2 describes a Markov Model (state-transition control system) that simplifies the MCS optimization guidance via an offset method as determined by the QoE estimates.

4.1 QoE from QoS

In embodiments, for ESM, the QoS objective may be extended to QoE via a logistic regression calculation that relates a QoE random variable, such as "happy/sad user/customer," to a linear combination of various measured QoS observables:

$$LLR_{QoE} = \log_{10}\left(\frac{p_{QoE}}{1 - p_{QoE}}\right) = \sum_{j=0}^{J} \beta_j \cdot \theta_j \quad \text{(eq. 59)}$$

where LLR is the log-likelihood ratio, and $p_{QoE}$, is the probability that the customer's QoE is good. It is noted that although $LLR_{QoE}$ is used with a logistic-regression method, this is not intended as a limitation on the scope of the present disclosure as $LLR_{QoE}$ may be derived using other methods including machine learning methods, such as supervised learning.

Variables $\theta_j$, j=1, . . . , J in Eq. 59 may comprise observables like number (or percentage) of historical collisions on the particular user's link, indications of errors or erasures on the link, a device-model/version indicator, large (max–min) data-rate variations, an application type (streaming video vs. short data packets vs. audio, etc.), and/or other observable metrics. FIG. 8 indicates that the current reported MCS and channel-gain values may be observables used in the overall ESM process. In embodiments, features may be extracted from other data and then converted into the observables, e.g., by applying nonlinear functions (for instance a neural-net rectified linear unit (RELU)) the observable data. $\beta_0$ may be a offset/constant and, thus, $\theta_0=1$. In embodiments, the LRM may learn the row vector of coefficients $\underline{\beta}=[\beta_0 \ldots \beta_J]$. The observables may be similarly stacked into a column vector $\underline{\theta}$, so $LLR_{QoE}=\underline{\beta}\cdot\underline{\theta}$. In embodiments, the QoS criterion in Eq. 16 may be then updated to be the QoE criterion $$\max_{r,|C|} \bar{b} = r \cdot \log_2|C| \text{ subject to:} \quad \text{(eq. 60)}$$

$$Pr\{LLR_{QoE} < \text{threshold}\} \leq 1 - r$$

The LRM may further learn the customer-QoE probability $LLR_{QoE}$ through various user QoE data collected by the LRM. In embodiments, $LLR_{QoE}$ may be estimated (or updated) over an observation interval (e.g., an interval that is relatively much longer than a symbol period) from this QoE data. The probability $p_{QoE}$ may be learned over several successive observation intervals and may have different values for different types of observation intervals, such as hours, days, peak-use/off-peak use periods, etc. A person of skill in the art will appreciate that a logistic regression can be used in cost function instead of constraints. For example, the solutions to the following equation minimize the bad QoE probability, while satisfying a minimum rate requirement.

$$\min_{r,|C|} Pr\{LLR_{QoE} < \text{threshold}\} \text{ subject to:} \quad \text{(eq. 61)}$$

$$\bar{b} = r \cdot \log_2|C| > b_{min}$$

It is noted that other functions that relate QoE data to one or more measured QoS observables may serve as suitable constraints in an adaptive optimization process according to various embodiments of the present disclosure. For example, generalized linear model, gradient boosting algorithm, hidden Markov chain may be used in place of logistic regression.

In embodiments, ESM may apply an individual metric, e.g., as defined in Eq. 59, across such observation intervals. The base of the log in Eq. 59 scales the learned $\underline{\beta}$. Base 10 logarithms lead to simple interpretations, such as that $LLR_{QoE}=2$ means that the user is happy roughly 99% of the time, while $LLR_{QoE}=5$ represents a "five-nines reliability," and so on. In embodiments, quantity $p_{QoE}$ may be presumed stationary or truly ergodic (if computed separately for different times like peak, off-peak or times of the week, the terms "cyclo-stationary" or "cyclo-ergodic" may also be used). Connectivity usage patterns/statistics have been often found in the field to be consistently periodic apart from some random unpredictable part that augments the consistent cyclo-ergodic/stationary part. The random part is inherently averaged or statistically bounded in ESM.

In embodiments, the regression vector $\beta$ may be computed from the raw data sets used to compute $p_{QoE}$, which may be matched to $\underline{\theta}$'s observation intervals. Such computation may use an index k for the series of successive observation intervals. For instance, an observation interval in which any of the events like call, dispatch, "dislike button," etc., occurs may be viewed as a binary QoE variable d with d=0, while periods of no (negative) consumer reaction set d=1. These variables may be aggregated into a data vector d over the set of such observation intervals. Correspondingly, the observations' value for the corresponding observation-interval index k is $\underline{\theta}_k$. The matrix $\Theta$ may stack these vectors of measurements as rows so that $\Theta^* = [\underline{\theta}^*_0 \ \underline{\theta}^*_1 \ \ldots]$. By initializing estimate of $\hat{\beta}_0 = 0$ and defining the data's intermediate probability estimate as $LLR_{QoE,k} = \hat{\underline{\beta}}_k \cdot \underline{\theta}^*_k$, the quantity $p_{QoE}$ may be estimated by $$\hat{p}_{QoE} = \frac{1}{1 + 10^{-\hat{\beta}_k \underline{\theta}^*_k}} \qquad \text{(eq. 62)}$$

An Iteratively Reweighted Least-Squares (IRLS) may be computed over all the observed data as $$\hat{\underline{\beta}}_{k+1} = \hat{\underline{\beta}}_k + \Theta^* \cdot (d - \hat{p}_{QoE,k}) \qquad \text{(Eq. 63)}$$

which will converge over reasonable conditions.

In embodiments, once an acceptable $\beta$ has been found, it may be used to compute an estimate of $LLR_{QoE}$ through Eq. 59 for situations where the actual QoE data are not yet known, but presumably ergodically consistent with previous findings. This may be particularized to individual users, depending on the LRM's desired sophistication (and age in terms of available earlier training data), as further examined in Subsection 4.2.

As the LRM experience grows over several observation intervals, the vector $\underline{\beta}$ may be used along with the computed distribution $p_g$ to predict the channels/dimensions that are to be used with appropriate corresponding energy, but then also used to predict the modulation-coding-system (MCS) parameters [r |C|] that will be best ergodically. Advantageously, the separation of the MCS parameters from assigned spectral energies does not reduce performance and it constitutes a simplification over many RRM methods. In embodiments, these MCS parameters, as a simplified function of g, may be communicated to the radio node as a set of recommended actions to be taken for that radio node's subsequently observed instantaneous $g_{geo,x}$ values. This $g_{geo}$ may also be reported (with delay) to the LRM as historical data for the LRM's subsequent calculations, as in FIG. 8, to complete the ESM feedback process. In this manner, the LRM may update its distributions and derived functional outputs to accommodate any new (unexpected and not predicted) conditions.

4.1.1 Example—Feature Extraction

A QoE probability of $p_{QoE}$=0.99 is observed in training data, meaning that only 1 user in 100 is showing discontent. Three observable QoS parameters are available: the number of packet errors over a certain time interval, the number of unexpected retrains or outages in that interval, and the difference in maximum data rate and minimum data rate over the interval. In training or feature extraction, it is noted that discontent periods will often show that at least 2 of the following 3 conditions are present:

TABLE 3a

Thresholds for 3 Observables' Feature Extraction

| Packet errors >100 | $\theta_{PE} = -1$; otherwise $\theta_{PE} = -1$ |
| Outages >3 | $\theta_{OUT} = -1$; otherwise $\theta_{OUT} = -1$ |
| Data Rate Change >2 | $\theta_{\Delta R} = -1$; otherwise $\theta_{\Delta R} = -1$ |

The simple feature extraction in Table 3a essentially hard-limits the observables at thresholds of occurrence. Then, the $LLR_{QoE}$ may be estimated, e.g., resulting in $\beta_{PE} = \beta_{OUT} = \beta_{\Delta R} = \frac{2}{3}$, which would correspond to the QoE range specification in Table 3b:

TABLE 3b

Inferred Feature Extraction with Continuous Range Between Thresholds

| Very Stable | $LLR_{QoE} < -\frac{4}{3}$ |
| Stable | $-\frac{4}{3} \leq LLR_{QoE} < 0$ |
| Unstable | $0 \leq LLR_{QoE} < \frac{4}{3}$ |
| Very Unstable | $\frac{4}{3} \leq LLR_{QoE}$ |

However, the observed feature extraction might instead be a piece-wise linear function with extreme values ±1, but intermediate values allowed for indication levels below the thresholds. In this case, the $LLR_{QoE}$ takes a continuum of values and falls into one of the ranges. Thresholds may be learned (as could the values of β be adjusted). This may be modeled as a depth-2 neural network with a RELU in the first stage to implement the feature thresholds and continuous outputs below the thresholds in Table 3a and the second (linear) stage to implement $\hat{\beta}$. The computed $LLR_{QoE}$ then provides a means to assess whether a current ESM guidance function may need update on the MCS coding-parameter functions. For instance, too many very unstable measurements would suggest more conservative coding parameters, e.g., lower code rate and/or smaller constellation size, be used in the guidance function, while very stable indications would suggest higher code rates and larger constellation sizes for larger data rates. These, in turn, may cause further adjustments in the thresholds and/or β values. Subsection 4.2 illustrates a fairly simple state-machine (or Markov models) that may be used for such situations to largely ensure the feedback system's stability.

4.2 Markov Modeling of Regression and Optimization Processes

Figure 9:
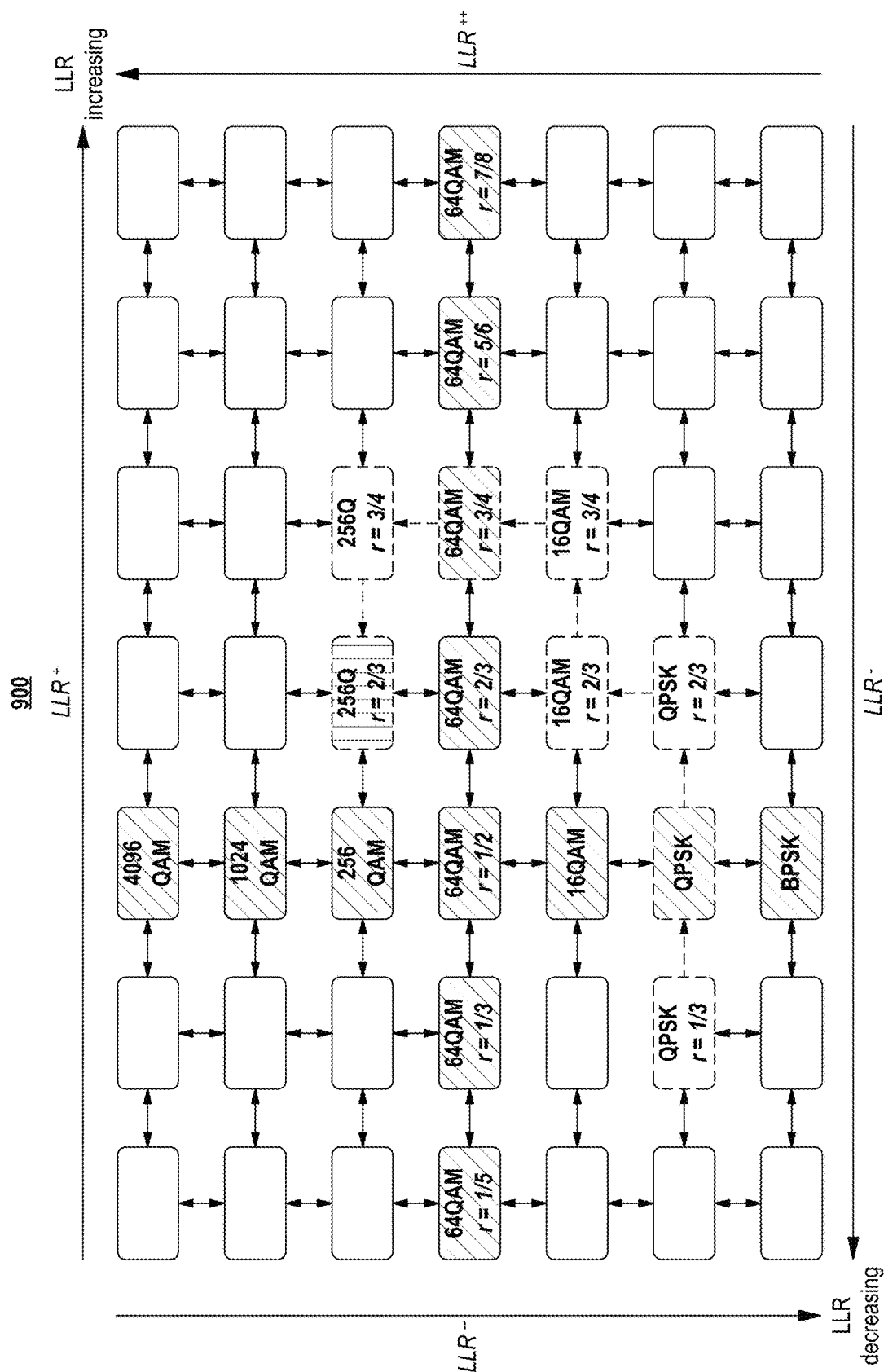
FIG. 9 illustrates an exemplary LRM's state-transition table (Hidden Markov Model) comprising MCS parameter choices for a particular radio node according to embodiments of the present disclosure.

FIG. 9 illustrates an exemplary LRM's state-transition table (Hidden Markov Model) comprising MCS parameter choices for a particular radio node according to embodiments of the present disclosure. Each box in FIG. 9 represents a state. The darkened boxes contain specific exemplary numbers, and similar numbers may easily be determined for the empty boxes by inspection: The constellation size |C| increases upward on the diagram and the code-rate parameter, r, increases to the right. The path having the darkest box indicates a possible sequence of MCS choices that start at QPSK (|C|=4) and r=⅓. In embodiments, an ESM optimization process first makes a code-rate increase to r=½ while holding the constellation size to QPSK; then the ESM process increases constellation size to 16QAM while maintaining code rate; these changes precede another code rate increase, two more constellation-size increases, and a code-rate decrease before a particular state (MCS setting) is determined that appears best for some system. This ESM-optimization sequence might have occurred, for instance, for a code being optimized according to Eq. 16. In embodiments, the sequence may occur in the LRM for certain QoE metrics that have been learned as a function of including the MCS state itself in the logistic regression process, as indicated by the feedback path in FIG. 8.

In embodiments, the LRM presumably knows the code and choices that a radio node can implement. These may be specified in standards for the transmission system (e.g., recent Wi-Fi versions have over 100 possible MCS settings proscribed by the standard), or they could be learned, e.g., over time, from observation of MCS settings supplied to the LRM, e.g., by creating an initially sparse version of FIG. 9 that may expand as settings are observed and applied. As FIG. 9 indicates, up and to the right in the transition table corresponds to a better QoE, while down and to the left indicates a worsening of the QoE. It is understood that optimization should try to move as far up and to the right in the state machine as possible, without violating the QoE, because these directions correspond to higher data rates. As person of skill in the art will appreciate that too aggressive behavior may result in added interference to other systems and cause responses that, in turn, may create reverse interference that may cause the channel gains to reduce, in which scenarios the state to be moved left and/or down in the transition table. In embodiments, transitions may comprise an $LLR_{QoE}$ threshold to determine whether the transition should be made or whether to best remain in the present state.

4.2.1 Example—QoE Estimation:

Table 4 illustrates 4 exemplary possible thresholds and associated actions for a particular state according to various embodiments of the present disclosure.

TABLE 4

Example Table of QoE State Transitions
for 1% Discontent Probability

| | | |
|---|---|---|
| Increase constellation size \|C\| | $LLR > LLR^{++} \geq 3.0$ | Move up (+2) |
| Increase code rate r | $LLR^{+} = 2.5 \leq LLR < 3.0 = LLR^{++}$ | Move right (+1) |
| No change | $2.0 \leq LLR < 2.5 = LLR^{+}$ | Stay (0) |
| Decrease code rate r | $LLR^{-} = 1.9 \leq LLR < 2.0 = LLR^{-}$ | Move left (−1) |
| Decrease constellation size \|C\| | $LLR < 1.9 - LLR^{--}$ | Move down (−2) |

The thresholds in Table 4 appear higher than those in Section 3's example. It is noted that that example did not include the ergodic-average MCS parameters as an observable, which presumably is used to drive QoE closer to the objective of 99% happy users. The numbers in the $3^{rd}$ column in Table 4 represent potential indications given by the LRM MCS guidance in the form of an offset to the instantaneous MCS that the radio node would otherwise (in the absence of ESM guidance) select. A "+2" represents a move up in constellation size relative to the nominal position in the state-transition diagram that would otherwise have been selected, while "+1" represents a move right, "0" represents remaining in the current state, and so on. It is understood that the values are merely exemplary and that other values may be chosen. For example, larger values in the $3^{rd}$ column may be used to facilitate more aggressive moves (e.g., beyond adjacent boxes) in the state diagram. This particular type of optimization is relative to what the radio node would do without guidance and, in effect, uses and improves upon the radio node's initial design-time models on MCS for a particular channel and interference.

5. Some ESM Results and Suggestions

ESM optimization processes so far have used relatively simple examples to illustrate various concepts of the present disclosure. In practice, a deployed system's settings and information transfers should be well designed and comprise data-based experience. Actual observables, learned thresholds, exact choice of spectra-selection/optimization algorithm, state deletion from state transition diagrams, distribution estimation, and other considerations may vary from deployment to deployment. Early ESM field use has achieved numerous benefits of optimization. One important area is QoE versus QoS. Subsection 5.1 addresses some field results that show QoE estimates versus actual aggregated customer data. Some optimization benefits are illustrated for various geographical regions. Subsection 5.2 discusses logical interfaces between radio nodes and the LRM that could be reasonably specified. Subsection 5.3 addresses synchronization assumptions and considers massive numbers of antennas.

It is noted that experimental and field results herein are provided by way of illustration and were performed under specific conditions using a specific embodiment or embodiments; accordingly, neither these experiments nor their results shall be used to limit the scope of the disclosure of the current patent document.

5.1 QoE/QoS Correlations and Ergodicity Examples

Figure 10:
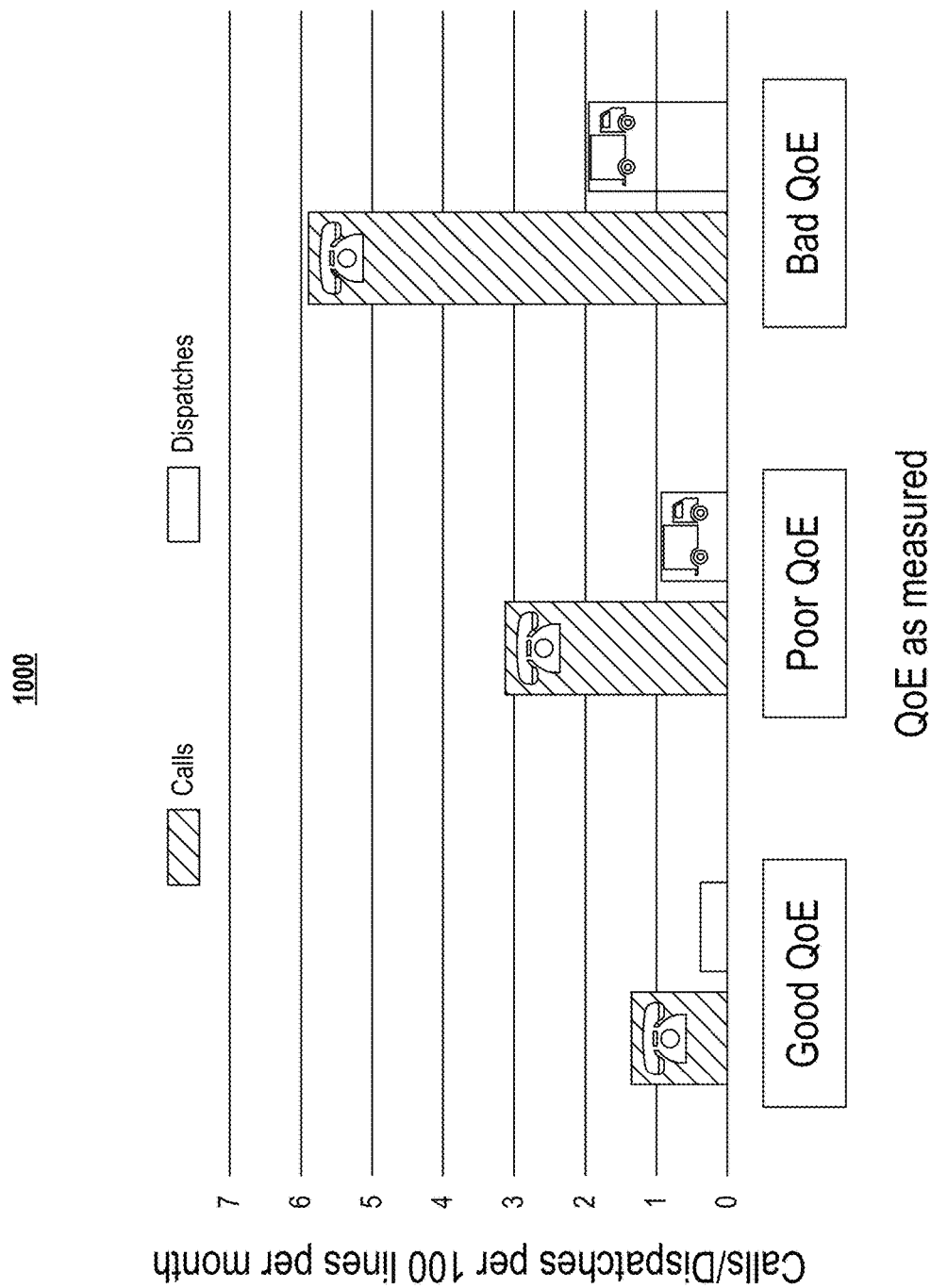
FIG. 10 illustrates ESM field-diagnostic correlation of calls/dispatches with LM/ESM declaration of connection QoE as good, poor, or bad.

Section 4.1's simplified example on stability suggested that the $LLR_{QoE}$ have intermediate ranges, e.g., good, poor, and bad. FIG. 10 illustrates ESM field-diagnostic correlation with the two QoE raw-data inputs of connections that had complaint calls and connections that needed a dispatch for repair. These field results are for millions of customers, who subscribe to an internet service, with Wi-Fi as the last link, and for which QoE data was available after a training phase. Thus, the data in FIG. 10 is not training data but measures the QoE estimation's true accuracy. QoS parameters comprising packet errors, retrain counts, and data rate changes were reported to the LRM, and then the $LLR_{QoE}$ was computed with the 3 ranges shown: good QoE, poor QoE, and bad QoE. As FIG. 10 shows, the projections based on the training correlate well with new data in that the LRM's declaration of a bad connection correlates strongly with a large percentage of calls and dispatches. Similarly, the LRM's declaration of a good connection corresponds to a comparatively low call and dispatch incidents. Once a correlation is established, the additional observable of MCS-parameter choice may be introduced to further improve the total number for bad QoE (unstable), as in FIG. 9's ESM process.

Figure 11:
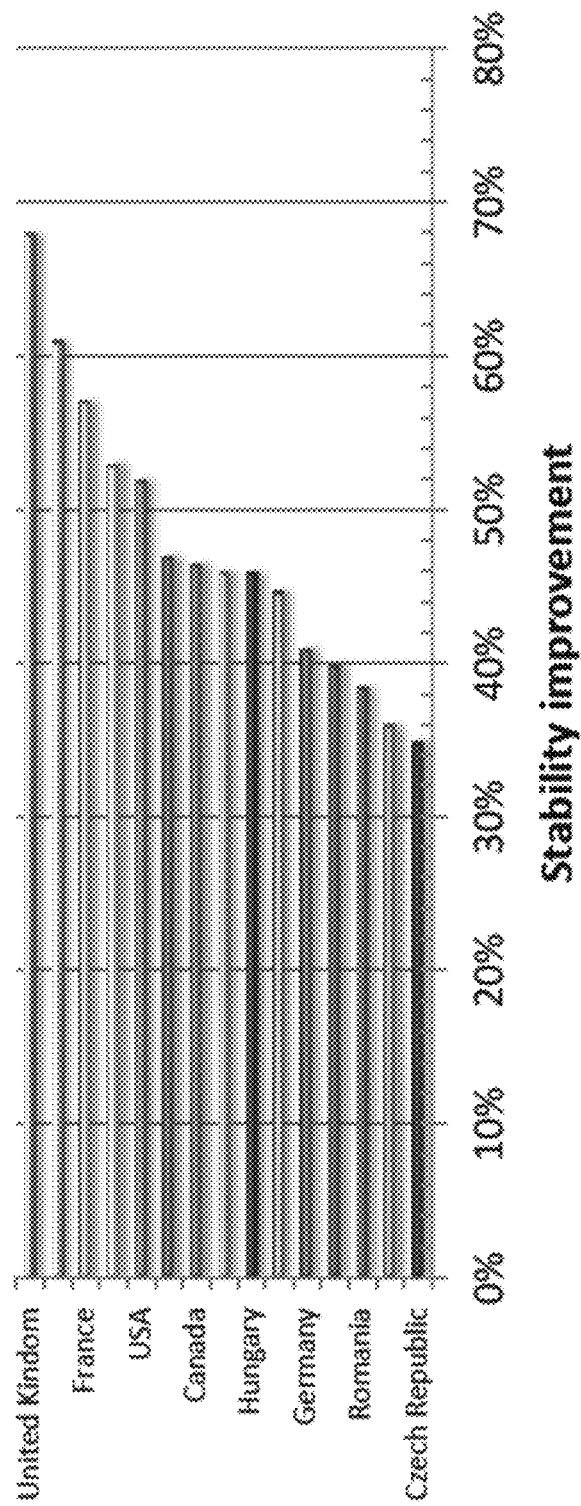
FIG. 11 illustrates ESM QoE improvement results in different global regions using embodiments of the present disclosure.

FIG. 11 illustrates ESM QoE improvement results in different global regions using embodiments of the present disclosure. Shown are field results of relatively simple ESM-based systems (e.g., about 10-20 states in the state transition diagram) that are used to alter MCS parameters for large internet service providers having a few hundred thousand to several million customers in the countries listed. In these systems, parameters varied were the code rate (2 choices roughly close to ¾, and ⁹⁄₁₀), power-margin, and data-rate combination of parameters equivalent to constellation size. The different levels of improvement merit some explanation. The UK and France have highly competitive internet-service markets with low pricing and service-providers offering higher speeds to retain customers. Those country's internet connection speeds often see aggressive setting of MCS and data-rate parameters. By isolating those customers who have poor QoE (as in FIG. 11) and then optimizing for them, ESM improves upon otherwise overly conservative designs that previously had applied correspondingly ubiquitous overly restrictive worst-case spectra and MCS choices. As result, ESM provides a better competitive internet service offering. The United States has a less competitive market (internet plus Wi-Fi) with higher prices and, thus, has less aggressive speed-attempt practice for internet service providers. Consequently, less gain occurs (although average connection speed is lower than for countries with aggressive speed attempts). A different country ordering might be observed for wireless LTE service, but the range of gains can be comparable. Countries listed low in FIG. 11 may be less competitive and also offer services that are not as bandwidth consuming or both.

Figure 12:
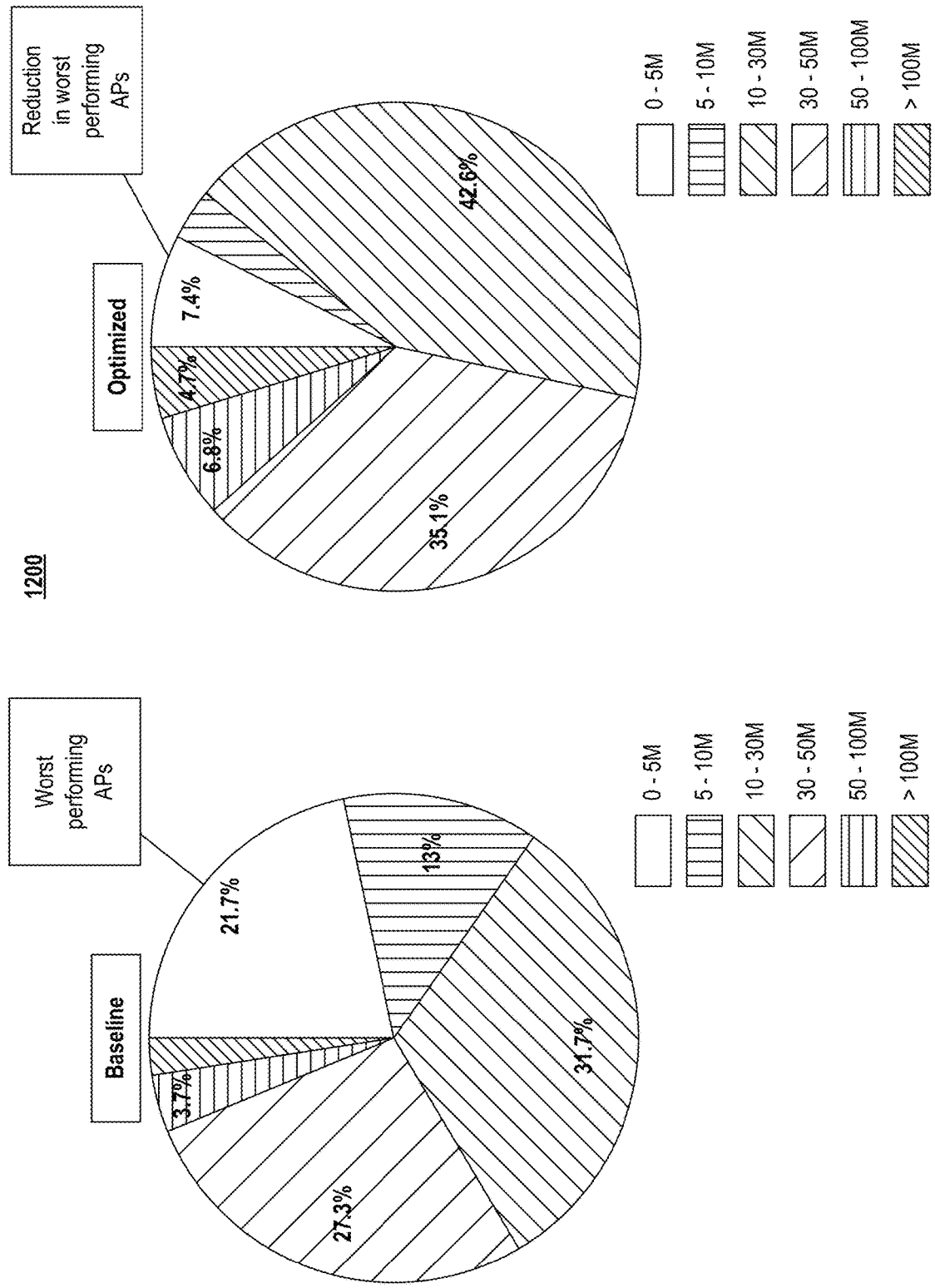
FIG. 12 depicts a simple QoS measure of throughput (defined as the volume of user data actually delivered over period of time) using embodiments of the present disclosure.

FIG. 12 depicts a simple QoS measure of throughput (defined as the volume of user data actually delivered over period of time) using embodiments of the present disclosure. As shown ESM throughput increases field results (Optimized) over NO ESM (Baseline). In this example, the system used largely IEEE 802.11ac components from a leading manufacturer, who takes pride in excellent designs, larger number of antennas, advertised speed, and expertise in their RRM methods sold. This baseline 802.11ac system has NO ESM and shows the speed distribution on average over several hundred thousand customers (powered by a fiber backhaul connection from the Wi-Fi access point, such that there was no "slow copper" limiting the throughputs. It is noted that these throughputs are generally much lower than speeds normally advertised for Wi-Fi connections). The optimized system uses an early form of simplified Stage 1 ESM that was imposed on the system. Low throughputs tend to correlate to poor QoE, and the highlighted areas show a reduction by over 3× the number of such very low throughputs (and correspondingly a shift towards higher average speeds throughout the deployment).

5.2 Migration Paths for ESM Application Interfaces

Subsection 5.1 cites an issue of "ESM-compatible" management interfaces (sometimes called "application programmer interfaces") for wireless equipment. Each ESM Stage requires increasingly more information from (and may provide somewhat more information to) the radio node and tacitly from/to its subtended devices. This subsection enumerates some information flows for consideration by standards groups, forums, or manufacturers who might consider providing such ESM-compatible interfaces.

An index k is used herein to represent time observation intervals. Information to/from the LRM may thus be associated through k to observation intervals. Exemplary intervals may be 15 minutes, 5 minutes, or 30 seconds. The radio node's time-stamp may accompany information flows from the radio node to the LRM. This should be the absolute k index of the first transmission that used the associated transmit energy $\varepsilon_{u,X}(k)$, $g_{u,X}(k)$ and corresponding MCS(k). For Stage 1 and 2 ESM, the time instant would be the beginning of packet data transmission corresponding to the parameters and such transmission's duration in symbols. For Stage 3, this is in terms of the corresponding established common symbol clock. Stage 1 and 2 do not need absolute accuracy of a common symbol clock and drifts or changes manifest themselves in changes of the distribution $p_g$.

5.2.1 Flows to the LRM

In embodiments, for $\varepsilon_{u,X}(k)$, the radio node may report the power spectral density for each used band X and user u (those not reported may be assumed unused or 0). For instance, a transmit power of 17 dBm in a single channel 20 MHz corresponds to the power spectral density of 17−73=−56 dBm/Hz. If that same power is equally distributed to two 20-MHz-wide channels, the reported energy is $\varepsilon_{u,X}(k)$=−59 dBm/Hz. If 4 antennas were used (with 4 spatial streams) equally on the same 20 MHz channel, the number would be −62 dBm/Hz for each. These numbers apply to both LTE and Wi-Fi. A reasonable range of transmit powers might range from as high as −30 dBm/Hz in LTE systems to perhaps as low as −93 dBm/Hz in Wi-Fi (with any smaller value causing no report and thus "0" energy emitted in that band) in 0.5 or 1 dB steps. Good ESM transmit reporting may include the energy in adjacent bands after filtering if known (since sidelobe energy may not be equal to zero).

Presumably this transmit power will eventually be controlled by the ESM, but it should also be reported because ESM guidance may be ignored (or need to be calibrated relative to issued guidance).

The parameter $g_{u,X}(k)$ is probably the most challenging in that present systems do not report it, despite it being essentially the well-quoted SINR (signal to interference-and-noise ratio) in technical documents, normalized to unity transmit power. However, LTE systems for instance do report a parameter called RSRQ (Reference Signal Received Quality) that may be used to compute $$g_{u,X} = \frac{RSRQ_{u,X}}{1 - RSRQ_{u,X}} \qquad (\text{eq. 64})$$

The RSRQ may be derived using LTE's RSRP (Reference Signal Received Power) channel output signal power for certain received training signals that are specific to the radio node (color) and measured by the receiver during training sequences (or for inserted pilot/reference signals in LTE). RSRQ is then the ratio of this to the total power received or RSSI (Received Signal Strength Indicator). Wi-Fi does not appear to report this quantity (presumably because its values may indirectly reveal manufacturers' proprietary design choices) although it is internally necessary in some form for all systems. The LRM may learn or infer it from reported MCS values if the code is known, but reporting may be considered safer. It is envisioned that Wi-Fi's future reporting of an $SINR_{u,X}(k)$ (along with $\varepsilon_{u,X}(k)$) for Wi-Fi is utilized as it may enable direct calculation of $g_{u,X}(k)$ by the LRM.

Known MCS parameters that typically comprise a finite number of options as specified by various standards, may be exchanged in a wireless systems of interest and reported to the LRM.

Stage 3 downlink transmission requires each radio node to measure the interference from other radio nodes using known transmission packets that are used for training and or reference/pilots. In embodiments, a radio node and associated devices support such measurement and report the results as a complex vector of measured gain/phase channel coefficients (for a single antenna at that device) $h_u$. Preferably, the measurement is taken when the relevant radio node is silent. The same methods that are used today for measuring its own such complex vector (same color) can be used for a different color in this situation. The value then is reported either directly from the measuring device to the LRM or indirectly through the radio node and then to the LRM. Stage 3 uplink requires no reporting of coefficients.

5.2.2 Flows from the LRM

In embodiments, the LRM's guidance functions may use a time index, e.g., for first implementation and thereafter of any guidance or change in guidance. In embodiments, the index may be the same index and resolution as that used in flows to the LRM.

The functional specification of energy may trivialize in Stage 1 IW to the specification of the water-level for each band, a constant $K_u$ if it is assumed that MCS parameters are also specified simultaneously. This may simplify ESM systems' implementation. Stage 2 may use a tabular specification of energy as $\varepsilon_{g,x}$ for each user sent to the radio node. In embodiments, the locally measured channel gain (e.g., computed locally by Eq. 63 and Eq. 64) may be used as the index to the table (shown as size M in Subsection 3.2). These may correspond to the number of partitions of the gain range to be used in computing the probability distribution $p_g$. Subsection 2.4.1 suggests one such range.

In embodiments, MCS parameters may have a similar table that is indexed by g, although the relative state-machine offset described in Subsection 4.2 may be a simpler way to achieve the same specification and make it also relative to local practice of the radio node and its client devices.

In embodiments, Stage 3 ESM may require, in the uplink case, an indication to the uplink radio-node receiver of which color other-node users are to be treated first, second, third in the nominal internal QR factorization (or determination of precoder). It is noted that this is not required by the LRM for Stage 3, but may be used for energy allocation guidance, e.g., in systems with mixed ESM stages, or where ESM Stage 3 vectored cancellation is imperfect. Stage 3 ESM downlink requires the same prioritization and indication but, in embodiments, may be based on the $h_u$ supplied.

5.3 Synchronization Embodiments

Stage 3 ESM requires a common-symbol clock. While inter-user phase shifts of a few samples in OFDM systems (with their "guard intervals") may not cause an excessive increase in interference, the symbol frequency should be common and accurate. A common clock is particularly useful in relatively stationary environments (e.g., when users are not moving or their movement is relatively slow). In these cases, Stage 3 is possible. If there is no common clock, Stage 1 or 2 are feasible. Because LRM cannot be the source of the common clock, in embodiments, Stage-3-ESM-compatible radio nodes may be designed to accommodate a symbol clock in Wi-Fi.

In embodiments, a process to establish a Wi-Fi common clock may comprise a Stage 3 ESM-compliant radio that may be phase-locked to a common symbol clock, e.g., for transmission, and be otherwise silent to avoid generating or sensing interference. In embodiments, a radio node that is capable of collision detect (Wi-Fi) may "look before it talks" and instead of waiting a random period of time, the node may continue reception to phase-lock to the largest interference that the node senses. This radio node may then transmit on that same symbol clock (e.g., at energies or with notches/nulls accordingly observed). In turn, other radio nodes that subsequently have traffic may follow a similar of same procedure. In embodiments, hidden radio nodes from a first radio node may eventually synchronize to the same symbol clock. Any non-ESM radio nodes would effect themselves through the channel gains measured and lead the guidance to accommodate that interference. In embodiments, where no synchronization has occurred, the performance would fall back to the performance of Stage 2, Stage 1, or even to the performance of an existing collision-detection system.

Figure 13:
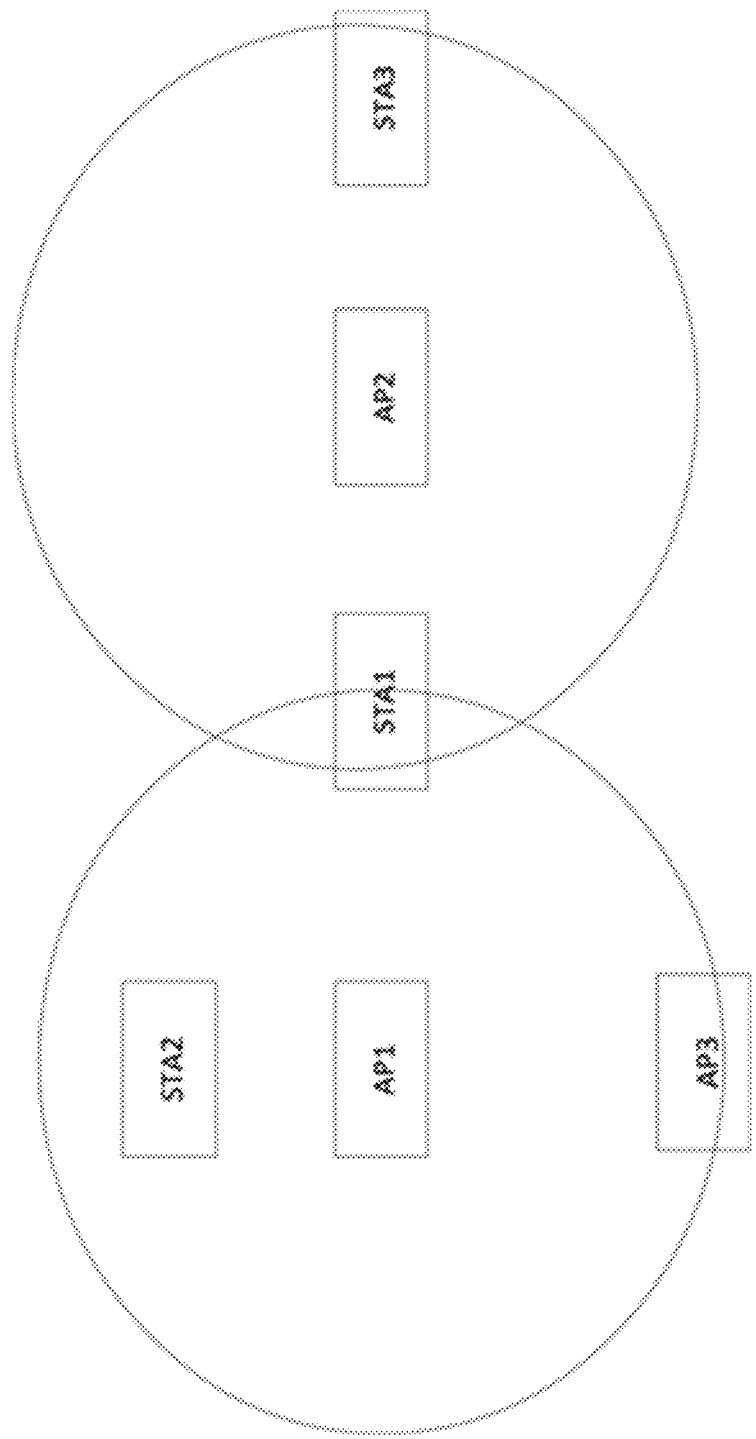
FIG. 13 depicts a wireless LAN network comprising numerous access points, according to embodiments of the present disclosure.

FIG. 13 depicts a wireless LAN network comprising numerous access points, according to embodiments of the present disclosure. In embodiments, the interference stems from neighboring wireless communication systems that may adapt energy and bit loading at different channels or may adapt the antenna configuration including beam-forming patterns. FIG. 13, the change of energy-and-bit loading or antenna configuration of AP1 may affect the $g_{geo}$ of the AP3, because AP3 is within the communication range of API and vice versa. Once AP3 learns the change of energy-and-bit loading or antenna configuration of AP1, AP3 it may update its own bit-and-energy loading. It is noted that the energy-and-bit loading comprises scenarios where no energy may be loaded to a certain frequency channel; therefore, it includes channel selection or assignment. In embodiments, the following steps may optimize energy-and-bit allocation of the APs:

1. AP1 computes $g_{geo,k,m}$, and the optimum energy-and-bit loading, while treating interference from all other APs as interference. In embodiments, AP1 may compute $g_{geo,k,m}$ for different combination of k and m; compute the optimum energy-and-bit loading; and select the combination that maximizes the sum of transmit rate or minimizes the sum of transmit power to achieve the minimum rate. It is noted that different antenna configurations, including different beam-forming patterns, may be used for different m; therefore, this step may comprise the evaluation of performance using different antennae. It is noted that any of the aforementioned energy-and-bit loading methods may be used in this step;

2. AP1 applies the energy-and-bit loading;

3. AP2 performs steps 1 and 2, while other APs do not update the energy-and-bit loading;

4. AP2 applies the energy-and-bit loading;

5. Continues until $AP_L$ completes steps 1 and 2; and

6. Repeat steps 1 through 5, e.g., until convergence is achieved.

This is different than iterative waterfilling, because this method treats each frequency channel, which consists of sub-carriers, as sub-carrier of conventional iterative water-filling. This method is herein called Ergodic Iterative Water-filling. In embodiments, Ergodic Iterative Waterfilling may use the probability distribution of the geometric SNRs instead of the actual values and again be implemented with outage probability targets. In embodiments, in order to speed up convergence, it may be desirable for at least a subset of Aps to agree on an adaptation order and on when to apply the newly adapted energy-and-bit loading. For example, once step 1 is completed, step 2 may apply the adapted energy-and-bit loading. This information may be communicated between different Aps. In embodiments, the actual water-filling of each connection may occur in parallel with the other systems and the aggregate may converge over all field configurations even though the algorithms may not follow any particular order as long as each is not running too fast.

It is noted that, in some instances, iterative waterfilling may result in an undesirable outcome. For example, the data-rate of one AP may be set to zero if the AP and the STA are relatively far apart. To resolve this problem, in embodiments, a minimum rate constraint may be added for the aforementioned optimization equation, where the minimum rate constraint is $$\Sigma_{k,m} \log_2\left(1 + \frac{b_{k,m}E_{k,m}g_{geo,k,m}}{\Gamma}\right) \geq R_{min},$$

and where $R_{min}$ represents the minimum rate of the AP.

In embodiments, a cloud server may collect energy-and-bit allocation optimization information, obtain an optimal allocation, and distribute the results to APs. In embodiments, the following steps may outline the operation of such a cloud server:

1. a cloud server may collect the list of APs that are candidates for energy-and-bit loading optimization;

2. the cloud server may determine the time when each AP should update energy-and-bit loading;

3. the cloud server distributes the energy-and-bit loading update time to the APs;

4. the APs follow the schedule in step 3 to operate iterative waterfilling; and 5. in response to receiving a message that indicates the convergence of iterative waterfilling, the cloud server stops the iteration.

In embodiments, instead of using a cloud server, a master AP may act as a coordinator of the above method. In embodiments, each unit may simply water-fill on its own with certain bands on/off, or powers specified along with rates.

In embodiments, there may be any number of STAs per AP. To optimize the energy-and-bit loading, the following variables may be defined:

i: index for AP i j: index for STA j $g_{geo,(i,j),k,m}$: geometric average of effective channel gain between AP i and STA j at frequency channel k with option m. It is noted that that this may change as other AP and STA change the energy loading.

$E_{(i,j),k,m}$: energy assigned for communication between AP i and STA j at frequency channel k with option m $b_{(i,j),k,m}$: Boolean variable that is 1 if AP i and STA j use frequency channel k with option m $E_{tot,i}$: Total transmit energy of AP i In embodiments, an optimal energy-and-bit distribution may be found by solving the following optimization problem:

$$\max_{E_{(i,j),k,m},b_{(i,j),k,m}} \Sigma_{(i,j)k,m} \log_2\left(1 + \frac{b_{(i,j),k,m}E_{(i,j),k,m}g_{geo,(i,j),k,m}}{\Gamma}\right)$$

subject to $\Sigma_{j,k,m}E_{(i,j),k,m}=E_{tot,i}$ for any i $0 \leq \Sigma_m b_{(i,j),k,m} \leq 1$ for any (i,j),k $b_{(i,j),k,m}=0$ or 1

The solution may be obtained using a steepest descent method. In certain cases, it may be desirable to allocate only one STA per frequency channel. This solution is called FDMA solution. In embodiments, an optimum FDMA solution may be obtained by solving the following problem:

$$\max_{E_{(i,j),k,m},b_{(i,j),k,m}} \Sigma_{(i,j)k,m} \log_2\left(1 + \frac{b_{(i,j),k,m}E_{(i,j),k,m}g_{geo,(i,j),k,m}}{\Gamma}\right)$$

subject to $\Sigma_{j,k,m}E_{(i,j),k,m}=E_{tot,i}$ for any i $0 \leq \Sigma_{m,j} b_{(i,j),k,m} \leq 1$ for any i, k $b_{(i,j),k,m}=0$ or 1

In embodiments, not all STAs receive a packet at a given time. Because it is difficult to obtain real-time network usage of all STAs, the optimal energy-and-bit loading may be derived assuming that the probability of each STA being active is known based on historical data. Denoting this probability as $P_{access,(i,j)}$, the solution to the following optimization problem, in embodiments, is the best energy-and-bit loading:

$$\max_{E_{(i,j),k,m},b_{(i,j),k,m}} \Sigma_{(i,j)k,m} P_{access,(i,j)} \log_2\left(1 + \frac{b_{(i,j),k,m}E_{(i,j),k,m}g_{geo,(i,j),k,m}}{\Gamma}\right)$$

subject to $\Sigma_{j,k,m}E_{(i,j),k,m}=E_{tot,i}$ for any i $0 \leq \Sigma_m b_{(i,j),k,m} \leq 1$ for any (i,j),k $b_{(i,j),k,m}=0$ or 1

$P_{access,(i,j)}$ may be a time-varying attribute of AP i and STA j. Therefore, $P_{access,(i,j)}$ may be estimated based on a recent network usage pattern. In embodiments, the solution may be implemented using the aforementioned ergodic iterative waterfilling method.

In FIGS. 13, AP1 and AP2 cannot directly communicate with each other due to the distance between them. However, the communication performance between AP1 and STA1 may be affected by the energy-and-bit loading of AP2 if STA1 is within the communication range of AP2. Thus, AP1 and AP2 may not exchange management information, such as when to apply new energy-and-bit allocation. Therefore, in embodiments, any number of methods may be used to facilitate proper management information exchange between APs. For example, (1) AP1 may exchange management information with AP2 if STA1 can relay the information between AP1 and AP2;

(2) AP1 and AP2 may send management information to a cloud server that computes an optimal energy-and-bit loading table and distributes it to AP1 and AP2; and (3) AP1 and AP2 may utilize a dedicated communication method that has, e.g., an about twice as long range as the communication method that delivers the payload data. If, for example, the path loss exponent of the wireless channel is 3.5, the communication range may be doubled if the receiver sensitivity of the wireless communication is improved by 10 dB (=3.5*10 log(2)). Therefore, in one embodiment, the APs may exchange management information using a dedicated communication method with a relatively longer range (or improved receiver sensitivity). This type of system may be implemented one or more of the following techniques: a) low modulation and coding rate (e.g., BPSK with 1/6 rate coding); b) by using sub-carriers with known low interference energy. This comprises the lower frequency sub-carriers of CH1 or the highest frequency sub-carriers of CH13; c) using non-coherent modulation, such as DPSK, in order to forego synchronization; and d) using retransmission schemes, such as ARQ and HARQ, e.g., chase combining, incremental redundancy, and the like.

By using the aforementioned techniques to facilitate proper management information exchange between APs, it is possible to design a dedicated communication method for exchanging management information directly between APs. The doubling of the range for this type of dedicated communication method addresses possible interference issues between neighboring Aps. For example, if AP1 cannot reach AP2 using this method, this indicates that AP2 may be too far away to affect AP1's STAs.

It is noted that methods (1)-(3) may be used at the same time, depending on the type of management information. For example, in embodiments, the cloud management server in method (2) may collect information from APs that are managed by the cloud server; whereas, each AP may exchange simple information with its neighboring APs, such as iterative waterfilling order or minimum bit-rate, using dedicated communication method for management data. For the latter case, as long as APs are close to each other, an AP may receive management data from the APs that are not managed by the cloud server.

In embodiments, the wireless communication systems use a CSMA/CA random access. A wireless communication system should monitor the channel and defer transmission if it detects that some other system uses the channel. For example in wireless LAN, a wireless communication system detects the energy or the wireless LAN header in order to detect whether another system uses the channel. The minimum receiver sensitivity for this detection is known as the CCA threshold. When a wireless communication system cannot detect any other user, it can wait for a random duration and then start to use the channel. If two or more wireless communication systems use the channel at the same time, the signals transmitted by the systems may not be decoded due to collision, which causes the wireless communication systems to wait relatively longer before attempting to access the channel. Therefore, collision reduces the overall system performance significantly. On the other hand, deferring the transmission may sometimes be unnecessary, because simultaneous transmission would not result in collision. Referring to FIG. 13, even when AP1 is communicating with STA1, in embodiments, AP2 may communicate with STA3 without interfering with the STA1/AP1 pair if it reduces the interference to STA1/AP1 by either reducing transmit power or by using beam-forming. Therefore, even if the received power from STA1 is larger than the CCA threshold, AP2 should still transmit the packet to STA3 in order to maximize the overall throughput. In 802.11ax, this is achieved by using BSS coloring—APs with same BSS colors are assumed to be far from each other; therefore, an AP can apply a higher CCA threshold if the received interference is from the AP with the same BSS color. In embodiments, the following information may be collected by the cloud server for BSS color and CCA threshold optimization: BSS color; current CCA threshold; receiver-transmitter time difference (RTTD); angle of arrival (AoA); link quality between APs or between AP and STAs that are associated with neighboring APs; and traffic load.

In embodiments, BSS colors and CCA thresholds of APs may be optimized by performing one or more of the following steps:

(1) using on RTTD, AoA, and link quality, estimate the probability of collision when each pair of APs uses the channel at the same time. It is noted that RTTD and link quality may be used to estimate the distance between APs and AoA and to estimate the direction of an AP. In one embodiment, the probability may be measured over time instead of being estimated;

(2) among the pair of APs with same BSS colors, finding the pair with the largest collision probability;

(3) changing the BSS color of one of the APs in an AP pair of step 2;

(4) changing the antenna configuration (e.g., beam forming) and/or reducing the transmit power of at least one of the APs in an AP pair of step (2);

(5) finding an AP where the average collision probability with other APs with same BSS color is relatively low;

(6) increasing the CCA threshold by a constant, and, in embodiments, if the new CCA threshold exceeds the maximum allowed CCA threshold, then, using the maximum allowed CCA threshold;

(7) changing the antenna configuration (e.g., beam forming) and/or increasing the transmit power of the AP;

(8) among the pair of APs with different BSS colors, finding the pair with the smallest collision probability;

(9) changing the BSS color of the pair such that both APs use the same BSS color;

(10) changing the antenna configuration (e.g., beam forming) and/or increasing the transmit power of at least one of the APs in an AP pair of step (2); and

(11) iterating steps (1) through (10).

In embodiments, the aforementioned information may be exchanged between APs, and because no entity is aware of the global allocation of BSS color or CCA threshold, each AP may make a decision on the BSS color and CCA threshold by itself.

Figure 14:
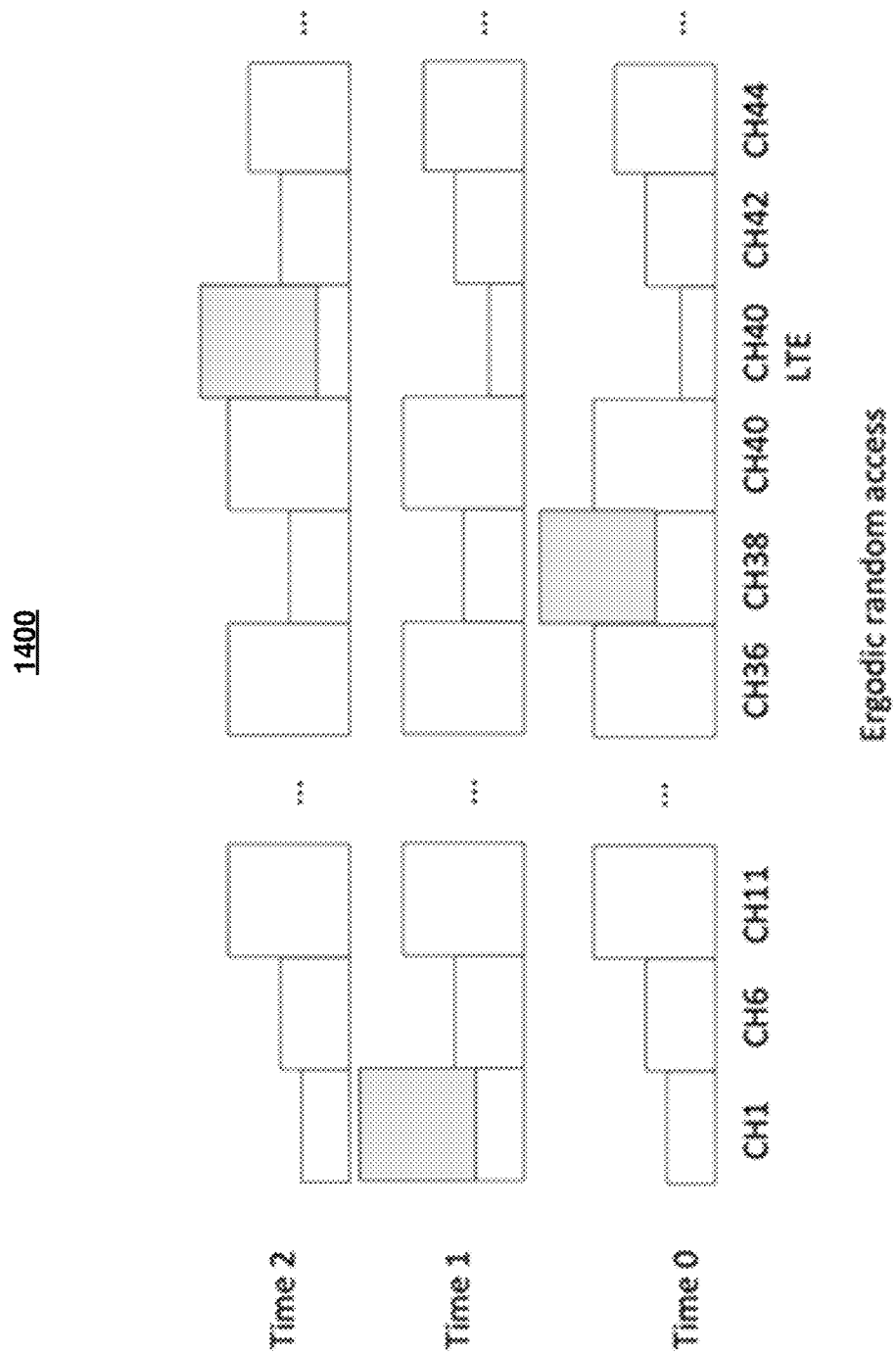
FIG. 14 depicts generalized random access for a wireless communication system that comprises one or more Wi-Fi and/or LTE channels, according to embodiments of the present disclosure.

FIG. 14 depicts generalized random access for a wireless communication system that comprises one or more Wi-Fi and/or LTE channels, according to embodiments of the present disclosure. In embodiments, a random access protocol that randomizes time, frequency channel, and space may be used to minimize the collision probability, while balancing the load at different frequency and spatial resources. When wireless communication systems share a frequency channel, the probability collision increases, and the throughput degrades if the collision probability is high. Upon collision, conventional CSMA/CA random access requires the wireless communication systems to wait for a longer duration before accessing the channel instead of changing channels or antenna coefficients. In embodiments, to avoid collisions, the wireless communication system may change the frequency channel to one with a less loaded frequency or spatial channel, or change antenna coefficients to explore a new spatial channel. By changing the frequency channel, wireless communication systems that are involved in the collision will use different frequency channels. By changing the antenna coefficients, wireless communication systems that are involved in the collision will change the interference pattern. In embodiments, one of the wireless communication systems changes the frequency channel or antenna coefficients upon a collision or when the system defers channel accesses due to carrier senses. In embodiments, one or more of the following random access scheme steps may be performed to avoid exponential degradation of the throughput.

(1) the AP computes $g_{geo,k,m}$;

(2) the AP selects a group of frequency channels as a candidate group, as illustrated in FIG. 14;

(3) the AP selects one of the frequency channels in the candidate group and sets $T_{access}$ to $p_{access,initial}$, where $p_{access,initial}$ is the probability that the AP changes the frequency channel upon the first collision. For example, in FIG. 14, CH38 is selected as the channel for random access;

(4) the AP uses the conventional random access such as CSMA/CA to access the channel;

(5) if the AP can successfully access the channel, setting $T_{access}=p_{access,initial}$ and resuming with step 4;

(6) if the AP detects a collision or defers access due to carrier sense, generating a uniform random number between 0 and 1, and if the uniform random number is less than or equal to $T_{access}$, resuming with step 3. For example in FIG. 14, when a collision is detected at Time 1, the AP updates the channel to CH1; otherwise, increasing $T_{access}$ and resuming with step 4.

It is noted that several channels may be used at the same time and, thus, several random access processes may operate at the same time. In embodiments, the AP may detect a collision at the STA side if the communication latency is increased. When changing frequency channel, the AP should broadcast the channel change information to the STAs that are associated with the AP. To facilitate this operation, in embodiments, the AP may perform one or more of the following steps:

(1) sharing the order of frequency channels that the AP will use in the future with STAs in advance;

(2) coordinating the channel change with a beacon interval. For example, announcing channel change using a beacon using the current frequency channel and then switching to a new frequency; and (3) AP/STA may have multiple transceivers and switching the frequency channel by using another transceiver pre-tuned to a new frequency channel.

Finally, $p_{access,initial}$ may be updated based on whether previous channel changes were successful or not. For example, if previous channel changes successfully resolved a collision or deferral due to carrier sensing, the AP may increase $p_{access,initial}$. Otherwise, the AP may decrease $p_{access,initial}$.

Figure 15:
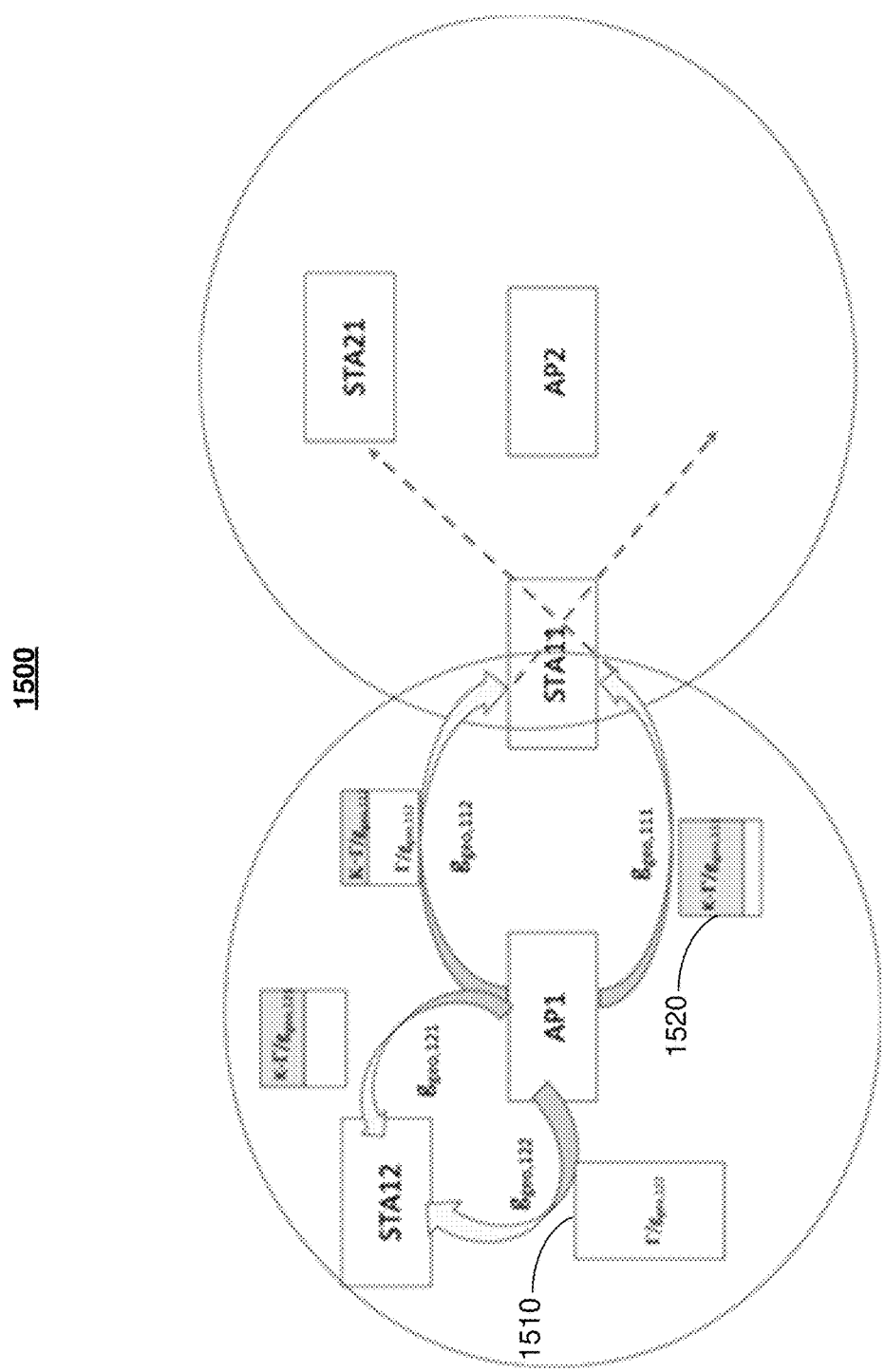
FIG. 15 depicts spatial random access according to embodiments of the present disclosure.

FIG. 15 depicts spatial random access according to embodiments of the present disclosure. In embodiments, different spatial dimension may be used upon a collision or carrier sensing. AP1 in FIG. 15 comprises four transmit antennae and communicates to STA12 and STA11. In FIG. 15, the height of the rectangle 1510 represents $\Gamma/g_{geo}$ of the spatial channel and the height of rectangle 1520 represents the energy allocated to the spatial channel, which corresponds to $K-\Gamma/g_{geo}$. In embodiments, according to waterfilling, three out of four spatial channels should be used in parallel to maximize or increase the data-rate. Each spatial channel may have a different interference pattern to and from AP2 or STA21, which is associated with AP2. In embodiments, using spatial random access, AP1 may select spatial channel 111 to communicate with STA11 and begin CSMA/CA. When AP1 senses carrier or detects collision, AP1 may switch to another spatial channel 112. The rest of the process is similar to frequency channel random access.

In embodiments, the probability to change frequency or spatial channel may be optimized by the cloud by performing one or more of the following steps:

(1) the APs may send a list of candidate frequency/spatial channels and $p_{access,initial}$ to the cloud. If an AP serves several stations, the AP should find the list per station. In embodiments, the APs may send the channel utilization of current frequency/spatial channel;

(2) the cloud server may update the list of candidate frequency/spatial channels based on the information collected from neighboring APs;

(3) the cloud server may update $p_{access,initial}$ based on the utilization of current frequency/spatial channels. The cloud server may assign different $p_{access,initial}$ for different frequency/spatial channels; and (4) the cloud server may send the updated list to the APs.

In embodiments, the probability to change frequency or spatial channel may be shared among the APs using the management channels.

6. Some Conclusions

Various embodiments take advantage of ESM's learned wireless-network's statistical consistencies to improve existing industry drives towards expensive concentrated edge computing/reaction for low-latency RRM controls. Advantageously, ESM may reduce the need for computation for RRM at the edge by moving computations to the cloud. ESM methods may have largest performance advantage when compared to collision-detection methods in unlicensed spectra (like Wi-Fi), but they also provide some improvement on more centrally coordinated systems like LTE's 4G/5G, e.g., by allowing artificially intelligent dimensional re-use by simultaneous users. Increasingly sophisticated ESM stages may be accommodated by relatively minor adjustments to management interfaces and by ensuring that they are available to cloud/internet servers (even if on slow control paths) that accommodate increasing ESM gain. ESM also provides a base for improving QoE and accommodates movement of users/devices across many bands/regions as they roam. ESM provides a cost-effective alternative to low-latency-only management schemes as wireless networks evolve. ESM also advances the industry toward high performance wireless now underway with Wi-Fi 6 and 5G.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 16:
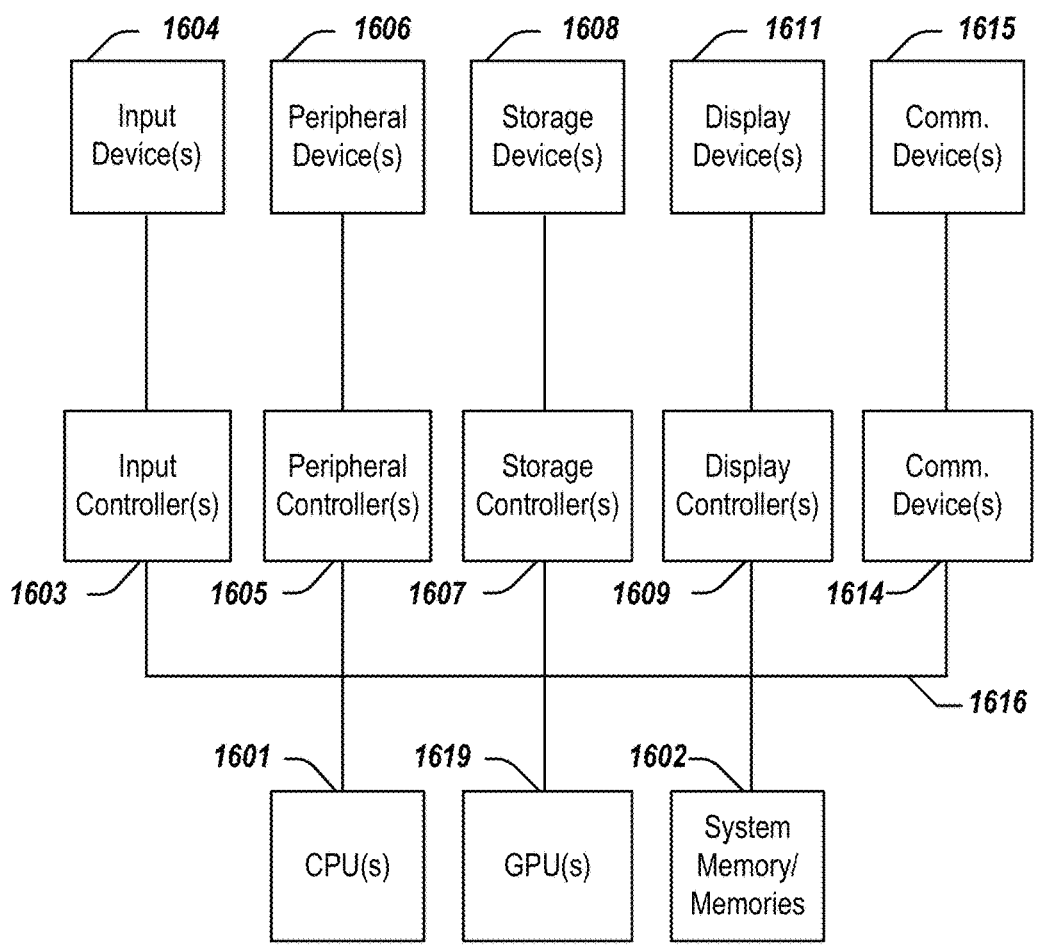
FIG. 16 depicts a simplified block diagram of an information handling system according to embodiments of the present invention.

FIG. 16 depicts a simplified block diagram of an information handling system (or computing system) according to embodiments of the present disclosure. It will be understood that the functionalities shown for system 1600 may operate to support various embodiments of a computing system—although it shall be understood that a computing system may be differently configured and include different components, including having fewer or more components as depicted in FIG. 16.

As illustrated in FIG. 16, the computing system 1600 includes one or more central processing units (CPU) 1601 that provides computing resources and controls the computer. CPU 1601 may be implemented with a microprocessor or the like, and may also include one or more graphics processing units (GPU) 1619 and/or a floating-point coprocessor for mathematical computations. System 1600 may also include a system memory 1602, which may be in the form of random-access memory (RAM), read-only memory (ROM), or both.

A number of controllers and peripheral devices may also be provided, as shown in FIG. 16. An input controller 1603 represents an interface to various input device(s) 1604, such as a keyboard, mouse, touchscreen, and/or stylus. The computing system 1600 may also include a storage controller 1607 for interfacing with one or more storage devices 1608 each of which includes a storage medium such as magnetic tape or disk, or an optical medium that might be used to record programs of instructions for operating systems, utilities, and applications, which may include embodiments of programs that implement various aspects of the present disclosure. Storage device(s) 1608 may also be used to store processed data or data to be processed in accordance with the disclosure. The system 1600 may also include a display controller 1609 for providing an interface to a display device 1611, which may be a cathode ray tube (CRT), a thin film transistor (TFT) display, organic light-emitting diode, electroluminescent panel, plasma panel, or other type of display. The computing system 1600 may also include one or more peripheral controllers or interfaces 1605 for one or more peripherals 1606. Examples of peripherals may include one or more printers, scanners, input devices, output devices, sensors, and the like. A communications controller 1614 may interface with one or more communication devices 1615, which enables the system 1600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1616, which may represent any number of physical buses. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using application specific integrated circuits (ASICs), programmable arrays, digital signal processing circuitry, or the like. Accordingly, the terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A system for improving quality of experience (QoE) with a wireless communication system, the system comprising:
   a first access node within a plurality of access nodes, the first access node collects data comprising a probability distribution of channel gains that have been obtained for one or more channels in the wireless communication system; and
   a processor coupled to the first access node, the processor identifies user or network behavior by performing steps comprising:
   receiving the collected data at a management interface, wherein the collected data comprises information to assess QoE including user satisfaction;

performing an ergodic analysis such that consistent use patterns within the collected data are exploited to determine a policy that satisfies one or more constraints; and providing the policy to at least one access node within the plurality of access nodes to cause the at least one access node to adapt one or more parameters to improve (QoE) with the wireless communication system.

2. The system according to claim 1 wherein the processor is a learn-ed resource manager (LRM).

3. The system according to claim 1 wherein the ergodic analysis is performed based on extracted consistent patterns within a channel along with collected feedback data.

4. The system according to claim 3 wherein the collected feedback data is provided from at least one of a user, a network operator, a consumer device, and network equipment or system.

5. The system according to claim 1 wherein the collected data comprises at least one of a geometric average channel gain, reference signal received power, reference signal received quality, interference data, and noise data.

6. The system according to claim 1 wherein determining the policy comprises using the collected data to predict a set of transmission parameters.

7. The system according to claim 6 wherein the set of transmission parameters comprises at least one of a modulation and coding-system (MCS) parameter, an energy parameter, a beamform parameter, a precoder parameter, a transmission's duration in symbol periods, a channel-frequency index, and a code-rate parameter.

8. The system according to claim 1 wherein the processor determines the policy by using at least one of an ergodic water filling method, an ergodic iterative water filling method, an ergodic spectrum management (ESM) Stage 1 iterative water filling, an ESM Stage 2 optimum spectrum balancing, an ESM Stage 2 orthogonal dimension division (ODD) method, an ESM Stage 3 method, a gradient descent method, and any other form of an iterative optimization method.

9. The system according to claim 1 wherein the processor uses at least one of a Quality of Service (QoS) data and the collected feedback data to estimate QoE parameters, the QoS data being related to line conditions.

10. The system according to claim 1 wherein the processor discretizes the probability distribution of channel gains into observation intervals that correspond to different MCS parameters.

11. A method for improving quality of experience (QoE) with a wireless communication system, the method comprising:

receiving collected data comprising a probability distribution of channel gains that have been obtained by one or more channels in the wireless communication system, wherein the collected data comprises information to assess QoE including user satisfaction;

performing an ergodic analysis such that consistent use patterns within the collected data are exploited to determine a policy that satisfies one or more constraints; and providing the policy to at least one access node within a plurality of access nodes within the wireless communication system, the policy causes the at least one access node to adapt one or more parameters to improve (QoE) with the wireless communication system.

12. The method according to claim 11 wherein the step of performing an ergodic analysis is performed by a learn-ed resource manager.

13. The method according to claim 11 wherein the ergodic analysis is performed based on extracted consistent patterns within a channel along with collected feedback data.

14. The method according to claim 13 wherein the collected feedback data is provided from at least one of a user, a network operator, a consumer device, and network equipment or system.

15. The method according to claim 11 wherein the collected data comprises at least one of a geometric average channel gain, reference signal received power, reference signal received quality, interference data, and noise data.

16. The method according to claim 11 wherein the step of determining the policy comprises using the collected data to predict a set of transmission parameters.

17. The method of claim 16 wherein the set of transmission parameters comprises at least one of a modulation and coding-system (MCS) parameter, an energy parameter, a beamform parameter, a precoder parameter, a transmission's duration in symbol periods, a channel-frequency index, and a code-rate parameter.

18. The method according to claim 11 wherein the step of determining the policy uses at least one of an ergodic water filling method, an ergodic iterative water filling method, an ergodic spectrum management (ESM) Stage 1 iterative water filling, an ESM Stage 2 optimum spectrum balancing, an ESM Stage 2 orthogonal dimension division (ODD) method, an ESM Stage 3 method, a gradient descent method, and any other form of an iterative optimization method.

19. The method according to claim 11 wherein the step of determining the policy uses at least one of a Quality of Service (QoS) data and collected feedback data to estimate QoE parameters, the QoS data being related to line conditions.

20. A non-transitory computer-readable medium or media comprising one or more sequences of instructions which, when executed by at least one processor, causes steps to be performed comprising:

receiving collected data comprising a probability distribution of channel gains that have been obtained by one or more channels in a wireless communication system, wherein the collected data comprises information to assess QoE including user satisfaction;

performing an ergodic analysis such that consistent use patterns within the collected data are exploited to determine a policy that satisfies one or more constraints; and providing the policy to at least one access node within a plurality of access nodes within the wireless communication system, the policy causes the at least one access node to adapt one or more parameters to improve (QoE) with the wireless communication system.

* * * * *